United States Patent
Rahman et al.

(10) Patent No.: US 6,571,082 B1
(45) Date of Patent: May 27, 2003

(54) WIRELESS FIELD TEST SIMULATOR

(75) Inventors: Iftekhar Rahman, Billerica, MA (US); Nabil Hinnawi, Boxborough, MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 09/430,105

(22) Filed: Oct. 29, 1999

(51) Int. Cl.$^7$ ............................................... H04B 17/00
(52) U.S. Cl. ..................... 455/67.1; 455/456; 455/67.4; 455/67.6; 342/451; 342/452
(58) Field of Search .................. 455/423, 424, 455/425, 67.1, 67.2, 67.3, 67.4, 67.5, 67.6, 115, 226.1, 456, 446, 448; 701/214; 342/357.06, 357.07, 357.08, 357.09, 357.1, 451, 452

(56) References Cited

U.S. PATENT DOCUMENTS

| | | | | |
|---|---|---|---|---|
| 4,679,248 A | * | 7/1987 | McKeown | 455/226.1 |
| 4,977,399 A | * | 12/1990 | Price et al. | 340/7.21 |
| 5,410,753 A | * | 4/1995 | Szabo | 455/67.4 |
| 5,561,841 A | * | 10/1996 | Markus | 455/446 |
| 5,794,128 A | * | 8/1998 | Brockel et al. | 455/67.1 |
| 5,862,455 A | * | 1/1999 | Martin et al. | 455/67.7 |
| 6,119,009 A | * | 9/2000 | Baranger et al. | 455/446 |
| 6,169,896 B1 | * | 1/2001 | Sant et al. | 455/424 |
| 6,308,064 B1 | * | 10/2001 | Green | 455/423 |
| 6,308,072 B1 | * | 10/2001 | Labedz et al. | 455/448 |

\* cited by examiner

*Primary Examiner*—Edward F. Urban
*Assistant Examiner*—Temica M Davis
(74) *Attorney, Agent, or Firm*—Leonard Charles Suchyta; James K. Weixel

(57) ABSTRACT

A method and system for testing network-based location determination technologies within a single test area in the field. Channel models are developed to simulate the propagation impairment conditions associated with identified test scenarios. The channel models for an identified test scenario can be developed by estimating the amount of multi-path, path loss, and Doppler frequency shift effects one would expect under the conditions and environment of the identified tests scenario. The path loss effects of an identified scenario may be estimated by combining the Okumura-Hata outdoor path loss models with available indoor path loss models. A single test area having receiving antennas and signal transmission of fixed and known geographic locations may be selected. A network-based location determination technology can be comprehensively tested at the single test location, under propagation impairment conditions not naturally occurring there, by modifying the system's signals according to the channel models developed to simulate the propagation impairment conditions of identified test scenarios. Similarly, cellular, personal communication systems (PCS), and broadband wireless communications system may also be tested for the quality of the voice and data transmissions at a single test location.

34 Claims, 17 Drawing Sheets

|  | CHANNEL A | | CHANNEL B | | CHANNEL C | |
|---|---|---|---|---|---|---|
| ROW | RELATIVE DELAY (nsec) | AVERAGE POWER (db) | RELATIVE DELAY (nsec) | AVERAGE POWER (db) | RELATIVE DELAY (nsec) | AVERAGE POWER (db) |
| 1 | 0 | 0 | 0 | 0 | 0 | 0 |
| 2 | 50 | -3.6 | 50 | -1.6 | 100 | -0.9 |
| 3 | 100 | -7.2 | 150 | -4.7 | 150 | -1.4 |
| 4 |  |  | 325 | -10.1 | 500 | -2.6 |
| 5 |  |  | 550 | -17.1 | 550 | -5 |
| 6 |  |  | 700 | -21.7 | 1125 | -1.2 |
| 7 |  |  |  |  | 1650 | -10 |
| 8 |  |  |  |  | 2375 | -21.7 |

FIG. 5A

|   | COLUMN | | | | | |
|---|---|---|---|---|---|---|
|   | CHANNEL A | | CHANNEL B | | CHANNEL C | |
|   | 1 | 2 | 3 | 4 | 5 | 6 |
|   | RELATIVE DELAY (nsec) | AVERAGE POWER (db) | RELATIVE DELAY (nsec) | AVERAGE POWER (db) | RELATIVE DELAY (nsec) | AVERAGE POWER (db) |
| 1 | 0 | 0 | 0 | 0 | 0 | -9 |
| 2 | 50 | -1.6 | 200 | -1.2 | 50 | 0 |
| 3 | 150 | -4.7 | 250 | -13 | 500 | -1.1 |
| 4 | 325 | -10.1 | 800 | -4.6 | 800 | -11.2 |
| 5 | 550 | -17.1 | 1250 | -7.2 | 2250 | -4.9 |
| 6 | 700 | -21.7 | 2100 | -6 | 4200 | -9.1 |
| 7 |   |   | 3050 | -13 | 6300 | -9.6 |
| 8 |   |   | 3750 | -21.7 | 7500 | -16.3 |
| 9 |   |   |   |   | 8550 | -18.6 |
| 10 |   |   |   |   | 10000 | -21.7 |
| 11 |   |   |   |   |   |   |

ROW

FIG. 5B

| | CHANNEL A | | CHANNEL B | | CHANNEL C | |
|---|---|---|---|---|---|---|
| | RELATIVE DELAY (nsec) | AVERAGE POWER (db) | RELATIVE DELAY (nsec) | AVERAGE POWER (db) | RELATIVE DELAY (nsec) | AVERAGE POWER (db) |
| 1 | 0 | 0 | 0 | 0 | 0 | 0 |
| 2 | 50 | -2.9 | 50 | -0.4 | 50 | -3 |
| 3 | 100 | -5.8 | 250 | -6 | 200 | -2.6 |
| 4 | 150 | -8.7 | 300 | -2.5 | 475 | -1.4 |
| 5 | 200 | -11.6 | 550 | -4.5 | 1000 | -1.2 |
| 6 | 250 | -14.5 | 800 | -1.2 | 1650 | -4.8 |
| 7 | 300 | -17.4 | 2050 | -17 | 2350 | -5.2 |
| 8 | 350 | -20.3 | 2675 | -10 | 2800 | -8.1 |
| 9 | | | | | 3500 | -10.1 |
| 10 | | | | | 5100 | -14.8 |

FIG. 5C

|  | CHANNEL A | | CHANNEL B | | CHANNEL C | |
|---|---|---|---|---|---|---|
| | RELATIVE DELAY (nsec) | AVERAGE POWER (db) | RELATIVE DELAY (nsec) | AVERAGE POWER (db) | RELATIVE DELAY (nsec) | AVERAGE POWER (db) |
| 1 | 0 | 0 | 0 | -5.2 | 0 | -4.6 |
| 2 | 50 | -0.4 | 50 | -3 | 300 | -0.1 |
| 3 | 250 | -6 | 300 | 0 | 350 | 0 |
| 4 | 300 | -2.5 | 750 | -0.8 | 750 | -0.3 |
| 5 | 550 | -4.5 | 1250 | -1.4 | 1250 | -0.5 |
| 6 | 800 | -1.2 | 5000 | -4.6 | 4000 | -7 |
| 7 | 2050 | -17 | 8900 | -9.6 | 10000 | -4.3 |
| 8 | 2675 | -10 | 13000 | -6 | 22000 | -4 |
| 9 | | | 17000 | -18.5 | 29000 | -8.2 |
| 10 | | | 20000 | -13 | 50000 | -16 |

FIG. 5D

|   | COLUMN | | | | | |
|---|---|---|---|---|---|---|
|   | 1 | 2 | 3 | 4 | 5 | 6 |
|   | CHANNEL A | | CHANNEL B | | CHANNEL C | |
| ROW | RELATIVE DELAY (nsec) | AVERAGE POWER (db) | RELATIVE DELAY (nsec) | AVERAGE POWER (db) | RELATIVE DELAY (nsec) | AVERAGE POWER (db) |
| 1 | 0 | -3 | 0 | -1.2 | 0 | -4.6 |
| 2 | 50 | -7 | 300 | -6 | 300 | -0.1 |
| 3 | 200 | 0 | 700 | 0 | 350 | -0.1 |
| 4 | 500 | -6.2 | 750 | -0.7 | 750 | -7 |
| 5 | 1200 | -5.2 | 1250 | -1.1 | 2250 | -0.7 |
| 6 | 1525 | -18.9 | 5000 | -5.2 | 8000 | 0 |
| 7 | 1750 | -21.7 | 8900 | -7.7 | 20000 | -5.8 |
| 8 |  |  | 15000 | -3 | 32000 | -7 |
| 9 |  |  | 21000 | -18.2 | 39000 | -7 |
| 10 |  |  | 25000 | -16 | 55000 | -10 |

FIG. 5E

| | CHANNEL A | | CHANNEL B | | CHANNEL C | |
|---|---|---|---|---|---|---|
| ROW | RELATIVE DELAY (nsec) | AVERAGE POWER (db) | RELATIVE DELAY (nsec) | AVERAGE POWER (db) | RELATIVE DELAY (nsec) | AVERAGE POWER (db) |
| 1 | 0 | -6 | 0 | -6 | 0 | -4.6 |
| 2 | 50 | -3 | 450 | -3 | 300 | -0.1 |
| 3 | 150 | 0 | 500 | 0 | 350 | 0 |
| 4 | 500 | -6.7 | 1050 | -1.5 | 750 | -0.3 |
| 5 | 850 | -1.2 | 3250 | -4.7 | 1250 | -0.5 |
| 6 | 1325 | -17.7 | 6000 | -3 | 4000 | -7 |
| 7 | 1750 | -23.4 | 8300 | -12 | 10000 | -4.3 |
| 8 | | | 10000 | -14.5 | 22000 | -4 |
| 9 | | | 12050 | -17.4 | 29000 | -8.2 |
| 10 | | | 15000 | -21.7 | 50000 | -16 |

COLUMN

FIG. 5F

| | MATERIAL TYPE | LOSS (DB) | FREQUENCY | REFERENCE |
|---|---|---|---|---|
| | ALL METAL | 26 | 815 MHZ | [Cox(83B)] |
| | ALUMINUM SIDING | 20.4 | 815 MHZ | [Cox(83B)] |
| | FOIL INSULATION | 3.9 | 815 MHZ | [Cox(83B)] |
| | CONCRETE BLOCK WALL | 13 | 1300 MHZ | [Rap91C] |
| | LOSS FROM ONE FLOOR | 20 - 30 | 1300 MHZ | [Rap91C] |
| | LOSS FROM ONE FLOOR AND ONE WALL | 40 - 50 | 1300 MHZ | [Rap91C] |
| | FADE OBSERVED WHEN TRANSMITTER TURNED A RIGHT ANGLE CORNER IN A CORRIDOR | 10 - 15 | 1300 MHZ | [Rap91C] |
| | LIGHT TEXTILE INVENTORY | 3 - 5 | 1300 MHZ | [Rap91C] |
| | CHAIN-LIKE FENCED IN AREA 20 FT HIGH CONTAINING TOOLS, INVENTORY, AND PEOPLE | 5 - 12 | 1300 MHZ | [Rap91C] |
| | METAL BLANKET - 12 SQ FT | 4 - 7 | 1300 MHZ | [Rap91C] |
| | METALLIC HOPPERS WHICH HOLD SCRAP METAL FOR RECYCLING - 10 SQ FT | 3 - 6 | 1300 MHZ | [Rap91C] |
| | SMALL METAL POLE - 6" DIAMETER | 3 | 1300 MHZ | [Rap91C] |
| | METAL PULLEY SYSTEM USED TO HOIST METAL INVENTORY - 4 SQ FT | 6 | 1300 MHZ | [Rap91C] |
| | LIGHT MACHINERY < 10 SQ FT | 1 - 4 | 1300 MHZ | [Rap91C] |
| | GENERAL MACHINERY - 10 - 20 SQ FT | 5 - 10 | 1300 MHZ | [Rap91C] |

| | | |
|---|---|---|
| HEAVY MACHINERY > 20 SQ FT | 10 - 12 | 1300 MHz | [Rap91C] |
| METAL CATWALK/STAIRS | 5 | 1300 MHz | [Rap91C] |
| LIGHT TEXTILE | 3 - 5 | 1300 MHz | [Rap91C] |
| HEAVY TEXTILE INVENTORY | 8 - 11 | 1300 MHz | [Rap91C] |
| AREA WHERE WORKERS INSPECT METAL FINISHED PRODUCTS FOR DEFECTS | 3 - 12 | 1300 MHz | [Rap91C] |
| METALLIC INVENTORY | 4 - 7 | 1300 MHz | [Rap91C] |
| LARGE I-BEAM - 16 - 20" | 8 - 10 | 1300 MHz | [Rap91C] |
| METALLIC INVENTORY RACKS - 8 SQ FT | 4 - 9 | 1300 MHz | [Rap91C] |
| EMPTY CARDBOARD INVENTORY BOXES | 3 - 6 | 1300 MHz | [Rap91C] |
| CONCRETE BLOCK WALL | 13 - 20 | 1300 MHz | [Rap91C] |
| CEILING DUCT | 1 - 8 | 1300 MHz | [Rap91C] |
| 2.5M STORAGE RACK WITH SMALL METAL PARTS (LOOSELY PACKED) | 4 - 6 | 1300 MHz | [Rap91C] |
| 4M METAL BOX STORAGE | 10 - 12 | 1300 MHz | [Rap91C] |
| 5M STORAGE RACK WITH PAPER PRODUCTS (LOOSELY PACKED) | 2 - 4 | 1300 MHz | [Rap91C] |
| 5M STORAGE RACK WITH LARGE PAPER PRODUCTS (TIGHTLY PACKED) | 6 | 1300 MHz | [Rap91C] |
| 5M STORAGE RACK WITH LARGE METAL PARTS (TIGHTLY PACKED) | 20 | 1300 MHz | [Rap91C] |
| TYPICAL N/C MACHINE | 8 - 10 | 1300 MHz | [Rap91C] |
| SEMI-AUTOMATED ASSEMBLY LINE | 5 - 7 | 1300 MHz | [Rap91C] |

| | | | |
|---|---|---|---|
| 0.6M SQUARE REINFORCED CONCRETE PILLAR | 12 - 14 | 1300 MHz | [Rap91C] |
| STAINLESS STEEL PIPING FOR COOK-COOL PROCESS | 15 | 1300 MHz | [Rap91C] |
| CONCRETE WALL | 8 - 15 | 1300 MHz | [Rap91C] |
| CONCRETE FLOOR | 10 | 1300 MHz | [Rap91C] |
| COMMERCIAL ABSORBER | 38 | 9.6 GHz | [Vio88] |
| COMMERCIAL ABSORBER | 51 | 28.8 GHz | [Vio88] |
| COMMERCIAL ABSORBER | 59 | 57.6 GHz | [Vio88] |
| SHEETROCK (3/8 IN) - 2 SHEETS | 2 | 9.6 GHz | [Vio88] |
| SHEETROCK (3/8 IN) - 2 SHEETS | 2 | 28.8 GHz | [Vio88] |
| SHEETROCK (3/8 IN) - 2 SHEETS | 5 | 57.6 GHz | [Vio88] |
| DRY PLYWOOD (3/4 IN) - 1 SHEET | 1 | 9.6 GHz | [Vio88] |
| DRY PLYWOOD (3/4 IN) - 1 SHEET | 4 | 28.8 GHz | [Vio88] |
| DRY PLYWOOD (3/4 IN) - 1 SHEET | 8 | 57.6 GHz | [Vio88] |
| DRY PLYWOOD (3/4 IN) - 2 SHEETS | 4 | 9.6 GHz | [Vio88] |
| DRY PLYWOOD (3/4 IN) - 2 SHEETS | 6 | 28.8 GHz | [Vio88] |
| DRY PLYWOOD (3/4 IN) - 2 SHEETS | 14 | 57.6 GHz | [Vio88] |
| WET PLYWOOD (3/4 IN) - 1 SHEET | 19 | 9.6 GHz | [Vio88] |
| WET PLYWOOD (3/4 IN) - 1 SHEET | 32 | 28.8 GHz | [Vio88] |
| WET PLYWOOD (3/4 IN) - 1 SHEET | 59 | 57.6 GHz | [Vio88] |
| WET PLYWOOD (3/4 IN) - 2 SHEETS | 39 | 9.6 GHz | [Vio88] |
| WET PLYWOOD (3/4 IN) - 2 SHEETS | 46 | 28.8 GHz | [Vio88] |
| WET PLYWOOD (3/4 IN) - 2 SHEETS | 57 | 57.6 GHz | [Vio88] |

FIG. 6C

| ROW | | | | |
|---|---|---|---|---|
| 58 | ALUMINUM (1/8") - 1 SHEET | 47 | 9.6 GHz | [Vio88] |
| | ALUMINUM (1/8") - 1 SHEET | 46 | 28.8 GHz | [Vio88] |
| | ALUMINUM (1/8") - 1 SHEET | 53 | 57.6 GHz | [Vio88] |

FIG. 6D

WIRELESS FIELD TEST SIMULATOR

FIELD OF THE INVENTION

The invention generally relates to field simulation and field testing of wireless systems, and more particularly to methods and systems for field testing network-based location determination technologies for wireless communication systems.

BACKGROUND OF THE INVENTION

Location determination technologies are increasingly being incorporated into, or being deployed in conjunction with, wireless communication service systems. An important application of wireless communications caller location determination technologies involves 911 emergency calls. Often, persons making 911 calls using wireless devices, e.g., cellular phones do not know their location or, due to injury, are unable to adequately convey this information. When a 911 caller's location can be quickly and accurately ascertained by location determination technologies, emergency assistance can be provided in a more timely manner. Caller location determination technologies may be directly integrated into a wireless communication service provider's existing communication system, or may be independent of the provider's existing wireless communication network.

In order to determine a wireless caller's location, a Location Determination Technology (LDT) estimates the parameters of a received signal(s) corresponding to a transmitted signal(s) originating from one or more transmitters. An LDT can be classified as network-based, handset-based or hybrid variations thereof.

For a network-based LDT, a signal is transmitted from a single handset transmitter and the received signal(s) are measured by one or more LDT receivers, which may be co-located with the wireless communication system's base station(s).

For a handset-based LDT, signals are transmitted from multiple sources. In the case of Global Positioning Satellite (GPS) Navigation System type handset-based systems, for example, signals are transmitted from multiple satellites. Measurement of received signals is performed by a single LDT receiver integrated into the handset. An LDT that is handset-based may be one of two types. One type uses signals from the GPS Navigation System as discussed above. The other type, a network-type handset-based system, uses signals sent from the wireless network base stations to the handset.

For hybrid variations of an LDT, both network-based and handset-based technologies are utilized to estimate a caller's location. For a network-based LDT and hybrid variations, the location of a caller is usually estimated or determined at a position determining equipment (PDE), i.e., a central, location determination estimator processor. For a handset-based LDT, the caller location estimation functionality may be integrated into the handset or it may reside in a PDE. For hybrid variations, the location of a caller is usually estimated at a PDE since the PDE determines which estimate is more reliable, the estimate determined by the network-based technology or the one from the handset-based technology.

A network-based LDT can use either Time Difference of Arrival (TDOA), Angle of Arrival (AOA), Location Fingerprinting (LF) or a combination of these techniques to determine the caller's location. TDOA determines the caller's location by measuring the time required for a transmitted signal to travel to several different receivers. Note that this use of "receivers" may include equipment such as one or more antennas in addition to electronic equipment necessary to detect and measure signals. With this technology, a minimum of three receivers with known locations are needed. The caller's relative distance from a receiver antenna is determined by multiplying the time it takes the signal to travel to the receiver by the signal's estimated speed, i.e. the speed of light. The difference of the caller's distances from any two receivers may be represented by a hyperbola, since the difference in distances of any point on the hyperbola from the two focii is constant and can be set equal to the measured difference. In this case the two focii are the two receiver locations, and the points on the hyperbola represent all possible caller locations. A minimum of two hyperbolae is determined using the difference in distances between the caller and two pairs of receivers. The caller's location is found by determining the location of the point at which the two hyperbolae intersect.

AOA technology requires a minimum of two receivers with known locations. At each receiver, the relative angle of the incoming signal is determined. The relative angle of the incoming signal can be represented as a straight line emanating from the receiver. The caller's location is found by determining the intersection of the two straight lines emanating from the receivers, i.e., by triangulation.

LF technology requires at a minimum a single receiver with a known location. In this approach, a receiver's area of coverage is "mapped" by transmitting signals from known locations and measuring and recording the received signals characteristics. For each location in a receiver's area of coverage, a corresponding signal characteristic is determined. This information may be compiled into a database for the receiver's area of coverage. When a signal is later received at the receiver, the caller's location is determined by comparing the characteristics of the incoming signal with the information in the database.

A caller's location, as determined by using the foregoing location determination technologies, is generally an approximation of a caller's true location. Network-based location determination technologies estimate the location of the signal source by analyzing the parameters of the received signal(s). The signal parameters, i.e., signal amplitude, frequency, and relative time delays, are affected by the propagation impairment conditions that are present in the signal transmission/reception area. The propagation impairment conditions are generally a function of both the distance between the signal transmitter and receiver, and the operating conditions found between those locations. "Geographic locations" (i.e., where something is actually physically located) of the signal transmitter and receiver determine the actual path distance that a signal travels to get from the transmitter to the receiver. The "operating conditions" are the physical conditions found between (and at) the locations of the signal transmitter and receiver that affect the signal parameters. The operating conditions affect upon a signal depends on many factors, such as whether the area is rural or suburban, the height and composition of any surrounding buildings, and whether the signal transmitter is located indoors or is in motion, to name just a few. Wireless communication LDTs utilize complex signal processing techniques to mitigate for possible propagation impairments. Wireless communication LDTs must be able to estimate a caller's location accurately, i.e., within some acceptable range of error, over the wide range of propagation conditions that may exist within the service provider's operating area. To comprehensively verify the accuracy of a LDT, these technologies should be tested under the wide range of conditions in which they are expected to operate.

Wireless communication LDTs are often tested in the laboratory, in the field (operating the system at known geographic locations and under actual propagation impairment conditions), or with a combination of both. Comprehensive field testing of a wireless communication LDT often involves traveling to many different test areas so that the location determination capabilities of the technology can be evaluated under different propagation impairment conditions. The disadvantages of conducting comprehensive field testing include: the amount of time required to conduct all the testing; the expenses incurred in setting-up the tests and traveling to the different test areas; and requiring the testing organization to obtain permission from many different service providers or services operating organizations within a single service provider, for use of their wireless spectrum and facilities.

Alternatively, wireless communication LDT capabilities can be evaluated in the laboratory by simulating the different conditions that a system might be expected to operate in. The desired test scenario, i.e, propagation impairment conditions, can be simulated in the laboratory through the use of hardware, software, or a combination of both. When testing a LDT in the laboratory, both the operating conditions of the desired test scenario, and the physical locations, i.e, "geographic locations," of the caller and receiver are simulated. A disadvantage of testing these technologies in the laboratory is that, because both the geographic locations and the operating conditions are simulated, the obtained results are generally less representative of a technology's true performance than those obtained from field testing. For this reason, some level of field testing, i.e., under actual propagation impairment conditions, is often conducted to verify the results of the laboratory simulation. Laboratory simulation has the further disadvantage of requiring the testing organization to have a fairly detailed knowledge of the inner workings of vendor-specific techniques, which vendors may be reluctant to provide. Furthermore, laboratory simulation development is often very time-consuming.

Thus, there is required an efficient method for testing wireless communication location determination technologies which is comprehensive, accurate, reliable and cost-effective.

SUMMARY OF THE INVENTION

In accordance with principles of the invention, techniques are used to simulate wireless impairments for testing wireless technologies. Such simulation has generally been performed in the laboratory environment requiring knowledge about the inner workings of technology being tested, such as particular techniques implemented. Prior art techniques provide for simulations performed separately from field testing that may leave a large credibility gap between simulation results and field test results.

In accordance with principles of the invention, disclosed is a method and system of testing a network-based LDT within one test area, having a receiver(s)and signal source of fixed and known geographic locations, in the field. A network-based LDT can be comprehensively tested within one test area by modifying the parameters of the transmitted and received signals to simulate the propagation impairment conditions of identified test scenarios. Channel models can be developed to simulate the propagation impairment conditions associated with identified test scenarios. The channel models for an identified test scenario can be developed by estimating the amount of multi-path, path loss, and Doppler frequency shift effects one would expect under the conditions and environment of the identified tests scenario. The path loss effects of an identified scenario may be estimated by combining the Okumura-Hata outdoor path loss models with available indoor path loss models. A network-based location determination technology can be comprehensively tested within a single test area under propagation impairment conditions not naturally occurring there, by modifying a transmitted signal according to the channel models developed to simulate the propagation impairment conditions of identified test scenarios.

The system of testing a network-based LDT within a single test area in the field may include a channel simulator to modify the signal according to the channel models developed for the identified test scenarios, a transmitter for transmitting the modified signal, transmitting and receiving antennae, cables to connect transmitters and receivers to respective antennae and amplifiers/attenuators to amplify or antennuate the received/transmitted signal as maybe needed.

The invention, unlike laboratory simulations, provides for simulating wireless impairments not necessarily naturally occurring within a test area while conducting field trials. Simulations are part of the field trials and represent more accurately real conditions than using laboratory simulation. The techniques of the invention also provide for treating the technology being tested as a "black box" without requiring proprietary knowledge about the technology being tested. Using the techniques of the invention, the caller's actual location is used and not simulated as in the laboratory. Additionally, unlike pure field trials, to be distinguished from simulation in combination with field testing techniques of the invention, a comprehensive testing of a particular wireless technology being tested does not require field trials to be conducted in very many test areas. Using these techniques of the invention, most of the impairments are simulated in a testing environment allowing for more controllable and repeatable testing than if many different testing areas are used in field trials using the conditions that may be naturally occurring at these different testing areas.

Thus, there is described an efficient method and system for testing wireless communication network-based location determination technologies which is accurate, reliable and cost-effective.

BRIEF DESCRIPTION OF THE DRAWINGS

Features and advantages of the present invention will become more apparent from the following detailed description of exemplary embodiments thereof, taken in conjunction with the accompanying drawings, in which:

FIGS. 5A–5F is an example of the signal multi-path models as developed by ANSI/TIA/EIA JTC for PCS;

FIGS. 6A–6D is an example of indoor signal path loss models;

DETAILED DESCRIPTION

Figure 1:
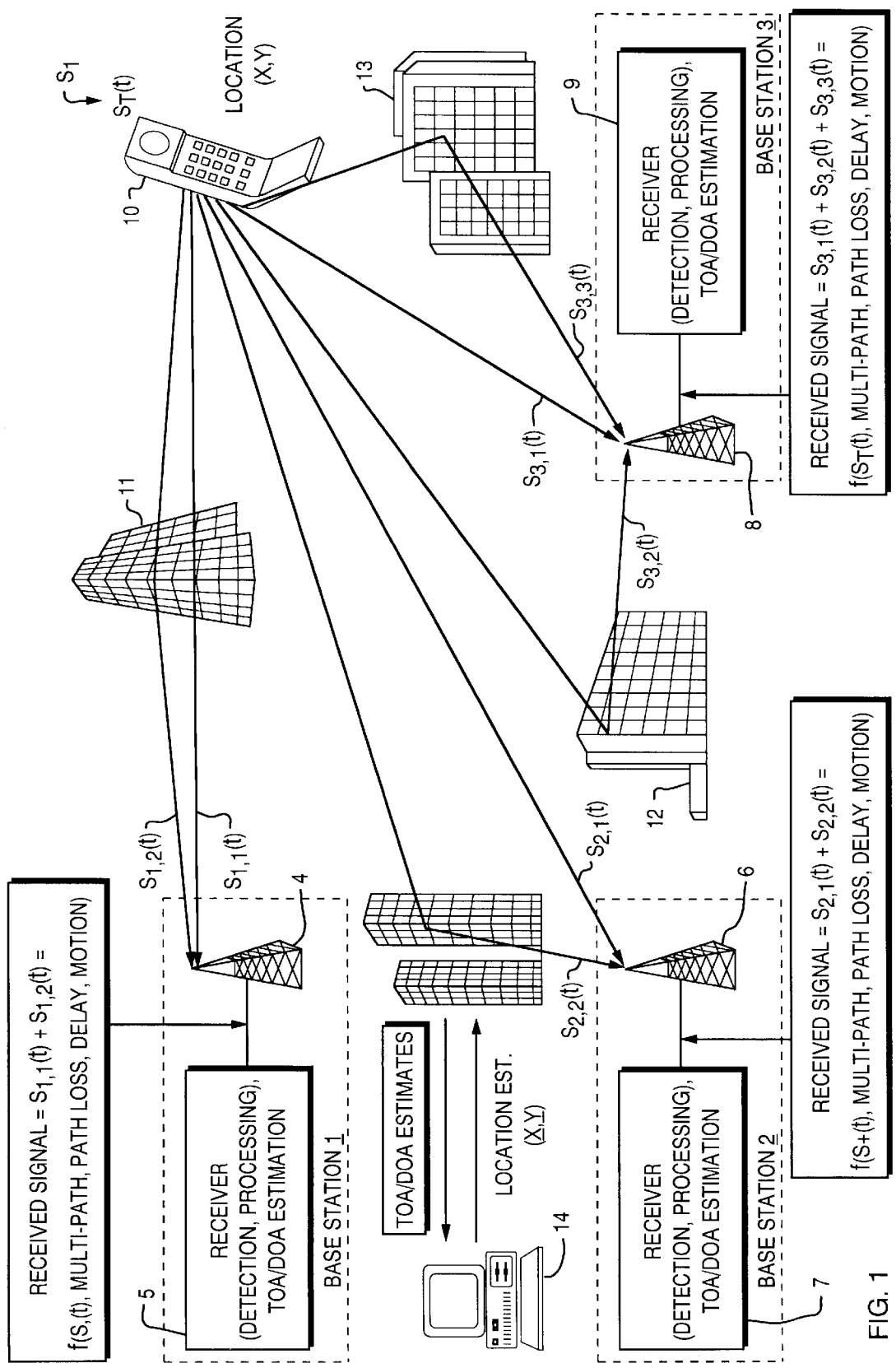
FIG. 1 is an example of an embodiment of an urban, outdoor environment in which a wireless communication network-based LDT may operate.

A network-based LDT can be tested in the laboratory, in the field, or by some combination of both. Propagation impairment conditions affect a signal's parameters as the signal travels from its transmission source to a receiving antenna. The conditions are determined by the scenario in which the signal transmission is operating. A network-based LDT may be tested in the laboratory by simulating the propagation impairment conditions associated with a desired test scenario. When tested in a laboratory, both the geographic locations of the caller and receiver(s) and the physical conditions that would be present at, and between, these simulated geographic locations, i.e, the propagation impairment conditions, for a desired test scenario are simulated. The technology's performance may be evaluated by comparing the network-based LDT's estimated caller location with the caller's simulated location.

A network-based LDT may be tested in the field, i.e., at actual geographic locations, by selecting a test area which is representative of a desired test scenario and placing the caller at known locations within that test area. By comparing the network-based LDT's caller location estimate with the caller's known location, the technology's performance for that test scenario can be evaluated. To comprehensively evaluate the performance of a network-based LDT over a wide range of operating conditions, i.e., propagation impairment conditions, the network-based LDT needs to be tested within many different test areas. Generally some level of field testing is necessary to comprehensively evaluate a network-based LDT's performance. By simulating the test scenario's caller and receivers' geographic locations and propagation impairment conditions, laboratory testing alone maybe an unreliable predictor of how a network-based LDT performs under actual operating conditions.

In accordance with the principles of the invention, comprehensive field testing of a network-based LDT can be accomplished within a single test area by simulating, within the single area, the propagation impairment conditions associated with many different test scenarios. Comprehensive testing of a network-based LDT includes field testing the technology under the wide range of conditions in which the technology is expected to operate when deployed, such as urban, suburban, rural, highway, flat terrain, hilly terrain, foliage, indoors, outdoors, mobile, and stationary conditions, and the like. Different conditions, i.e., scenarios, produce different propagation impairments on a transmitted handset signal. By being able to comprehensively field test a network-based LDT within a single test area, the time, effort, costs and logistics associated with conducting field tests within multiple test areas can thereby be avoided.

Signal parameters (e.g., amplitude, frequency, and relative time delay) are affected by the propagation impairment conditions present within the operating area. As a signal travels from a source to a receiving antenna, i.e., within the operating area, the signal parameters are altered depending upon the propagation impairment conditions present. The propagation impairment conditions, for a given area, are the cause of the multi-path, path loss, and Doppler frequency shift effects, which are described in greater detail in the following paragraphs, that a signal traveling through an area may experience. Instead of testing a network-based LDT within many different locations to evaluate its performance under different test scenarios, i.e., different propagation impairment conditions, comprehensive field testing can be accomplished within a single test area by holding the geographic locations of the caller and receiving antenna(s) fixed within that test area and simulating the propagation impairment conditions of different test scenarios. The different test scenarios can be simulated in the field by developing channel models corresponding to the propagation impairment conditions of a given test scenario. In other words, one can replicate a test scenario by artificially producing the equivalent path loss, multi-path, and Doppler frequency shift which is characteristic of that scenario's propagation impairment conditions.

Referring now to FIG. 1, shown is an example of an embodiment of an urban, outdoor environment in which a wireless communication location determination technology may operate. The embodiment of the LDT of FIG. 1 includes LDT receivers co-located with three base stations. While LDT receivers do not have to be co-located with base stations, co-location is preferable to allow for reuse of base station equipment and space, e.g., towers, antennae, etc. As shown in FIG. 1, each base station 1–3 includes a receiving antenna and a signal receiver/processor. For example, base station 1 includes receiving antenna 4 and signal receiver/processor 5. However, the signal receiver/processors may be co-located with the base station, or may be located elsewhere. For example, signal receiver/processor 5 may be co-located with base station 1, or may be located elsewhere. Signal $S_T(t)$, $S_1$, is transmitted from handset 10 and arrives at the receiving antennas 4, 6, and 8.

A received signal is generally characterized by various parameters such as frequency, amplitude, and time delay. These parameters, and thus the received signal, may depend upon the original signal $S_T(t)$ parameters, the multi-path and path loss effects, and whether the signal emanates from a moving source. Multi-path effects occur when the same transmitted signal, as may be caused by signal path deflections, arrive at a single receiving antenna over multiple paths. FIG. 1 illustrates a scenario where multi-path signals arrive at the receiving antennas. At receiving antenna 4, for example, signal $S_{1,1}(t)$ represents a signal which travels directly from handset 10 to the receiving antenna 4, and signal $S_{1,2}(t)$ represents a signal which deflects off building 11 and is received at receiving antenna 4. The deflected signal, $S_{1,2}(t)$, may arrive at receiving antenna 4 out of phase (due to the difference in distance it travels) and with a smaller amplitude compared to that of the "direct" signal $S_{1,1}(t)$. Three signals are shown arriving at receiving antenna 8. Signal $S_{3,1}(t)$ represents a signal which travels directly from handset 10 to the receiving antenna 8. Signal $S_{3,2}(t)$ represents a signal deflected from building 12, and signal $S_{3,3}(t)$ represents a signal deflected from building 13.

Path loss effects are signal attenuations that occur when a signal travels from its source to a receiving antenna. Path loss is a function of both the distance between its source and the receiving antenna and the conditions present. For example, as signal $S_{1,1}(t)$ travels from handset 10, i.e., its source, to receiving antenna 4 it experiences path loss. Path losses effect, for example, parameters such as a signal's amplitude. Received signal $S_{1,1}(t)$, for example, will have a smaller amplitude than the transmitted signal $S_T(t)$. Motion of the handset 10, at the time the signal $S_T(t)$ is transmitted, causes a Doppler shift of the wireless communication's signal frequency.

The signal(s) received at receiving antennas 4, 6, and 8 are analyzed by signal receiver/processor 5,7 and 9, respectively. The nature of the signal receiver/processors' analysis of the received signals generally depends on the type of LDT being utilized, e.g. TDOA, AOA, or LF, but generally includes determining signal Time-of-Arrival (TOA) or Direction-of-Arrival (DOA) estimates. The TOA/DOA estimates determined by the signal receiver/processors 5, 7 and 9 are transmitted to a central location determination estimator processor 14, i.e., the PDE, where the caller's location estimation may be determined.

Figure 2:
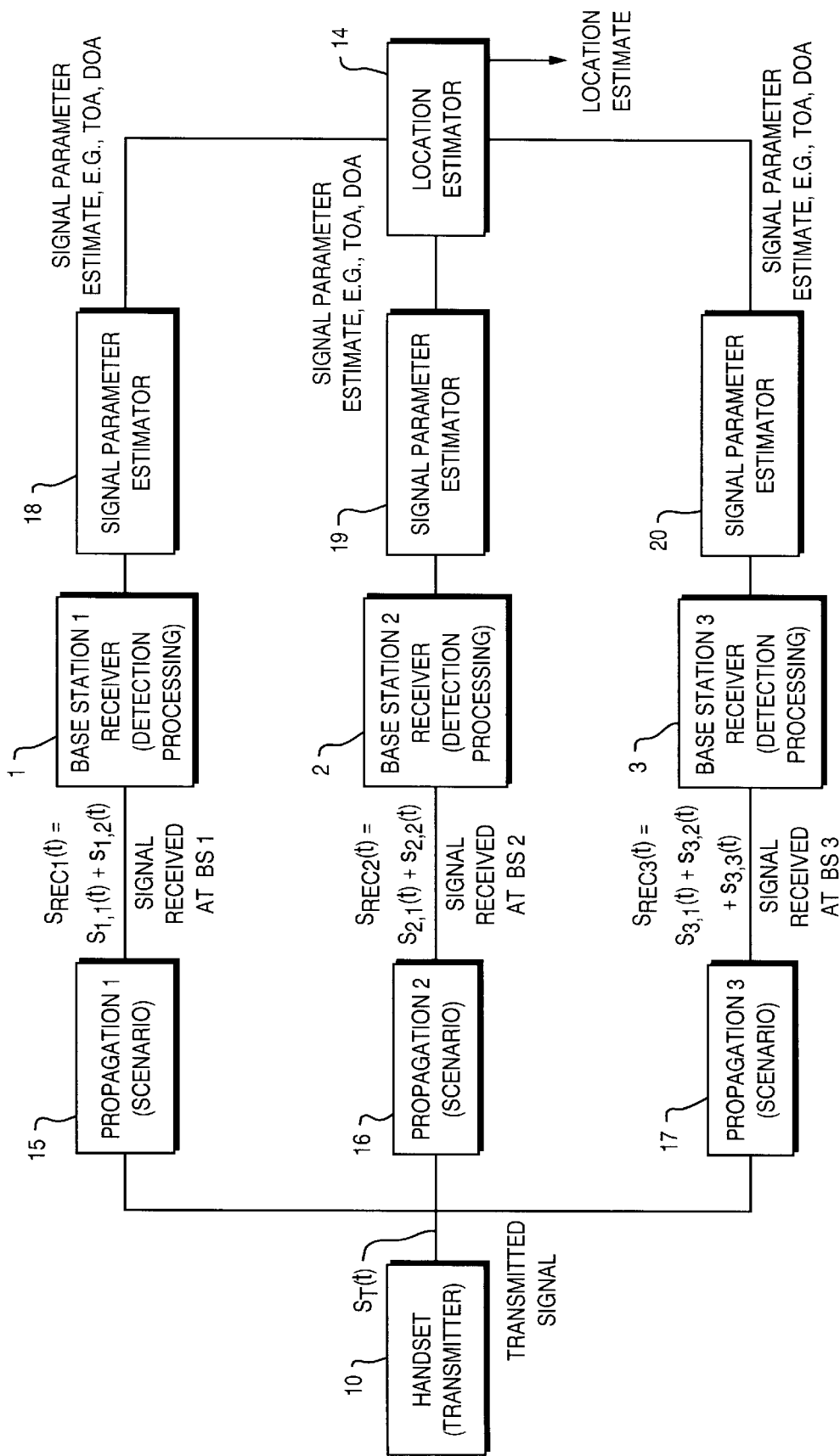
FIG. 2 is a flow diagram of an example of an embodiment of a network-based LDT model.

Referring now to FIG. 2, shown is a flow diagram of the network-based LDT of FIG. 1. The handset 10 transmits signal $S_T(t)$, $S_1$. The receivers of a network-based LDT may analyze the parameters of the received signals to assist in determining the caller's location. The characteristics of the parameters of the signal(s) received at a given receiver will be affected by the propagation impairment conditions that affect the transmitted signal $S_1$. The propagation impairment conditions affects on a transmitted signal for a given area can expressed as a "propagation scenario." The propagation scenarios of the conditions and environments illustrated in FIG. 1 can be expressed as propagation scenarios 15, 16 and 17, corresponding to base station 1, base station 2, etc. Propagation scenario 15, therefore, represents the propagation impairment conditions signals that result in signals $S_{1,1}(t)$ and $S_{1,2}(t)$ being received at base station 1. The signal receiver/processors of each corresponding base station analyze the received signals' parameters and determine signal TOA and DOA estimates, as represented as cells 18, 19 and 20 of FIG. 2, where cell 18 represents the signal processing that occurs at base station 1, etc. The TOA and DOA estimates, as determined by the base station signal receiver/processors, may be compiled into a central location determination estimator processor 14 where the caller's location estimation is determined.

Figure 3:
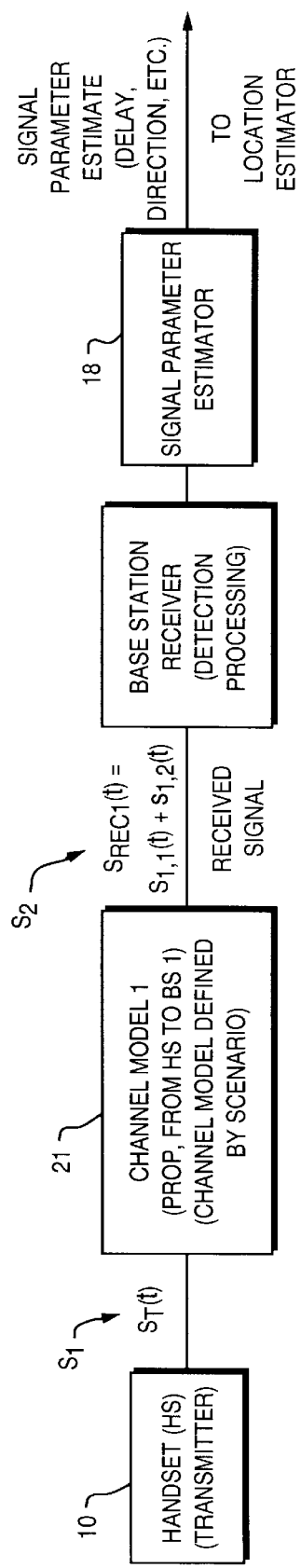
FIG. 3 is a block diagram of an example of an embodiment of the role of the channel model concept in a location estimation technology.

Referring to FIG. 3, shown is a block diagram of an example of an embodiment of the role played by the channel model in location estimation. The channel model is generally used to represent how a signal may be modified to simulate the effects of the propagation impairment conditions of an identified test scenario. Therefore, the channel model represents a way in which parameters of a signal may be modified, such as to simulate the effects that the propagation impairment conditions of an identified test scenario would cause on a signal as it travels from a transmitter to a receiving antenna.

By utilizing channel models, the propagation impairments conditions of many different test scenarios can be simulated within a single test area in the field. Channel models may be developed by estimating the propagation impairments conditions that affect signal parameters for a given test scenario. A single test area having receiving antennas and signal transmission of fixed known geographic locations can be chosen. By transmitting a signal from a handset to the receiving antennas of a network-based LDT, the performance of the network-based LDT under the naturally occurring propagation impairment conditions found at the chosen test area can be evaluated. The network-based LDT can further be evaluated within the same test area under propagation impairment conditions not naturally occurring there by modifying the signal sent from a handset according to the channel models developed to simulate the propagation impairment conditions of a given test scenario.

FIG. 3 shows that the parameters of handset 10's signal $S_T(t)$, $S_1$, for example, may be modified in accordance with channel model 21 to cause a signal equivalent to $S_{REC1}(t)$, $S_2$, corresponding to the propagation impairment conditions associated with base station 1 of FIG. 1, to be received and processed by the base station LDT receiver. In other words, the channel model 21 represents the parameter modifications of signal $S_1$ necessary to cause a signal which is equivalent to $S_2$—the signal received at base station 1 under the propagation impairment conditions illustrated in FIG. 1—to be received at base station 1 LDT receiver of the network-based LDT located at the selected test area. It should be noted that channel models similar to channel model 21 are used in conjunction with LDT receiver at base stations 2 and 3 of FIG. 1.

Modification of the transmitted signal, $S_1$ for example, to simulate the propagation impairments conditions of an identified test scenario causes signals equivalent to the signals that would be expected under the actual (i.e., non-simulated) conditions of the identified test scenario to be received and processed by the network-based LDT. Since signals equivalent to those that would be expected under the actual conditions of an identified tests scenarios may be received and processed, the performance of the network-based LDT under the simulated conditions of many different test scenarios may be evaluated. By being able to simulate the propagation impairments conditions of many different test scenarios through the use of channel models, comprehensive testing of a network-based LDT may be achieved within a single in-the-field (i.e., a non-laboratory setting with known geographic locations) test area.

The block diagram of FIG. 3 portrays the corresponding top row of FIG. 2 only, namely, the signal $S_1$ transmitted from handset 10 and the signal $S_2$ received at base station 1. The middle and lower rows of FIG. 2, corresponding to base stations 2 and 3, respectively, may be similarly represented.

Figure 4:
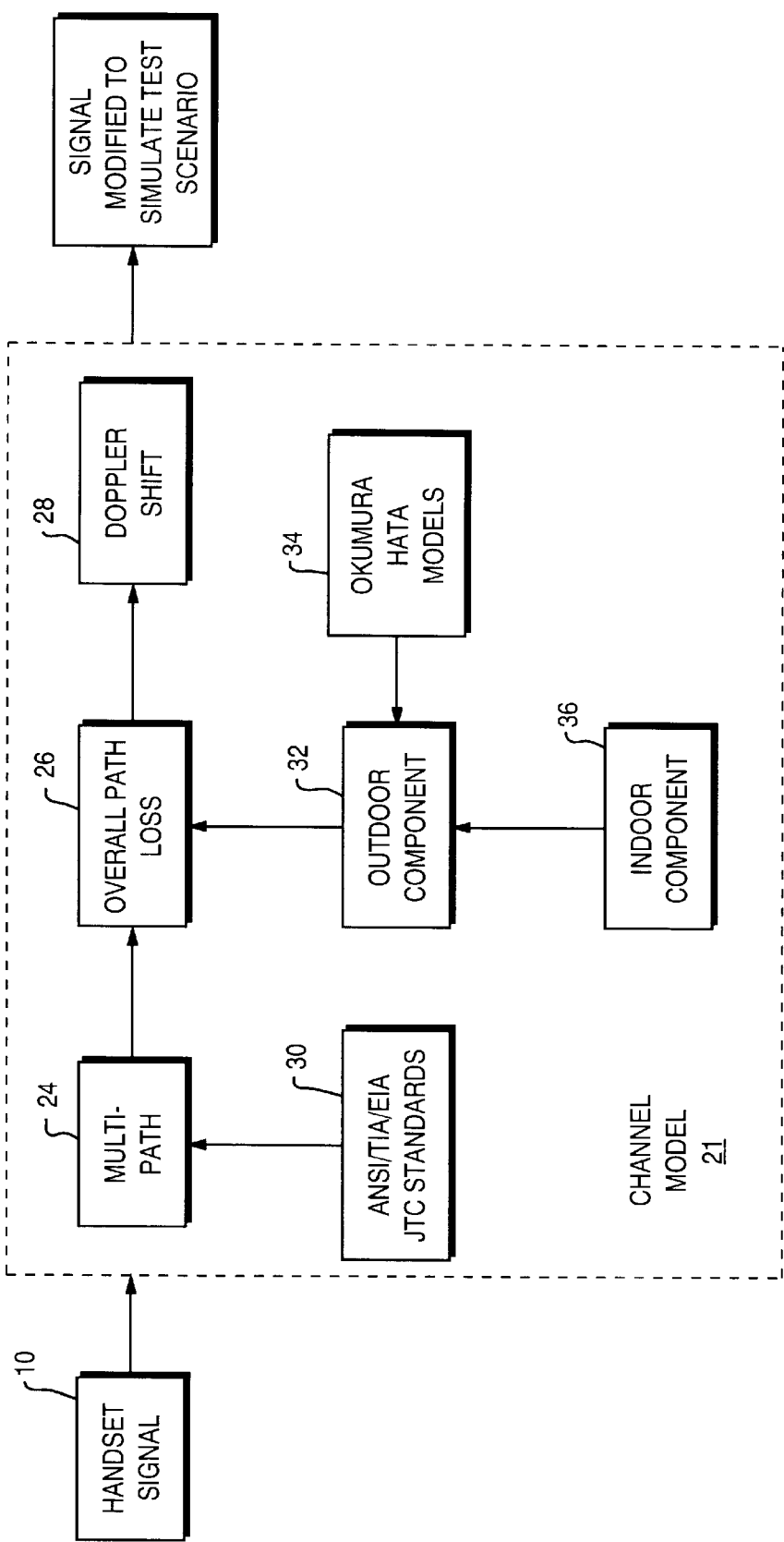
FIG. 4 is an example of an embodiment of the use of a channel model to simulate wireless impairments.

Referring to FIG. 4, shown is a example of an embodiment of a channel model. The channel model 21 represents how a handset signal may be modified to simulate the propagation impairment conditions of a given test scenario. By stimulating the multi-path 24, overall path loss 26, and Doppler shift effects 28, i.e., the propagation impairment conditions, that may be expected under the actual environment and conditions of a given test scenario, the corresponding channel model 21 for that test scenario can be developed.

The multi-path component 24 of a channel model 21 may be developed by using multi-path standard models, such as those developed by the ANSI (American National Standards Institute)/TIA/EIA (Telecommunications Industry Association/Electronic Industries Association) JTC (Joint Technical Committee) standards established for PCS (Personal Communication Systems) 30. While PCS is a wireless system similar to wireless cellular systems it operates at higher frequencies than wireless cellular systems, the published ANSI/TIA/EIA JTC standards for PCS may also be used for modeling wireless cellular frequency multi-path effects since the multi-path propagation at the two ranges of frequencies are expected to be similar. The multi-path ANSI/TIA/EIA JTC for PCS standard models are described in more detail below.

Again referring to FIG. 4, the overall path loss 26 component of the channel model 21 is dependent upon whether the identified test scenario assumes an urban, suburban or rural environment, and whether the signal source, i.e. the handset 10, is assumed to be indoors or outdoors. The overall path loss 26 may be represented as having an outdoor component 32 and, depending upon the identified test scenario, an indoor component 36. One way to determine the urban, suburban or rural environment outdoor component 32 of the overall path loss 26 is to use the Okumura-Hata outdoor path loss models 34. The Okumura-Hata outdoor path loss models 34 generally state that the outdoor component 32 of the overall path loss 26 is dependent upon the following factors: environment of the operating area, i.e., urban, suburban, or rural; the distance from the handset transmitter to the receiving antenna; the antenna height of the handset transmitter; and, the height of the receiving antenna.

The Okumura-Hata outdoor path loss models 34 for the outdoor component 32 of the overall path loss 26 for various environments and conditions described above, i.e., urban, suburban, rural, height of handset antenna, height of receiving antenna, are provided below:

For Urban Areas

The following formulae give the outdoor path loss in dB (decibel) in urban areas.

$$L_{50}(\text{urban})(\text{dB})=69.55+26.16 \log f_c - 13.82 \log h_{te} - a(h_{re}) + 44.9 - 6.55 \log h_{te}) \log d \quad \text{Formula 1}$$

in which, $f_c$ is the frequency of the signal emitted from the mobile terminal or cellular handset, in MHz, from 150 MHz to 1500 MHZ $h_{te}$ is the effective receiving antenna height in meters, ranging from 30 m to 200 m $h_{re}$ is the effective mobile, e.g., handset, antenna height in meters, ranging from 1 m to 10 m $a(h_{re})$ is the correction factor for the effective mobile antenna height which is a function of the size of the coverage area and, d is the transmitter-receiver antenna separation distance in kilometers (km).

It should be noted that when determining the outdoor path loss 32 according to the Okumura-Hata outdoor path loss models 34 described, the actual transmitter-receiver antenna separation distance, d, corresponding to the selected locations within the selected test area, generally, unless otherwise noted below, should be used in the above formula.

For, a small to medium sized city, the effective mobile antenna height correction factor is given by $$a(h_{re})=(1.1 \log f_c - 0.7)h_{re} - (1.56 \log f_c - 0.8) \text{dB} \quad \text{Formula 2}$$

and for a large city, it is given by $$a(h_{re})=8.29(\log 1.54 \, h_{re})^2 - 1.1 \text{ dB for } fc \leq 300 \text{ MHz} \quad \text{Formula 3}$$

$$a(h_{re})=3.2(\log 11.75 \, h_{re})^2 - 4.97 \text{ dB for } fc \geq 300 \text{ MHz} \quad \text{Formula 4}$$

For Suburban Areas

The following formula gives the outdoor path loss in dB in suburban areas.

$$L_{50}(\text{dB})=L_{50}(\text{urban}) - 2[\log (fc/28)]^2 - 5.4 \quad \text{Formula 5}$$

where fc is the frequency of the signal emitted from the mobile terminal or cellular handset, in MHz from 150 MHz to 1500 MHz, and $L_{50}$ (urban) is determined by formulas 1–4 above, depending upon the size of the coverage area, the frequency of the handset transmission, the transmitting and receiving antennae heights and the distance between the transmitter and the receiver.

For Rural Areas

The following formula gives the outdoor path loss in dB in open rural areas.

$$L_{50}(\text{dB})=L_{50}(\text{urban}) - 4.78[\log fc]^2 + 18.33 \log fc - 40.94 \quad \text{Formula 6}$$

where fc is the frequency of the signal emitted from the mobile terminal or cellular handset, in MHz from 150 MHz to 1500 MHz, and $L_{50}$ (urban) is determined by formulas 1–4 above, depending upon the size of the coverage area, and the frequency of the handset transmission, the transmitting and receiving antennae heights and the transmitter to the receiver distance.

When the network-based LDT being tested operates on signals at a frequency above 1500 as MHz, the Okumura-Hata model described above should be modified. The following formula extends the Okumura-Hata models, as applied to the outdoor component 32 of the overall path loss 26, beyond 1500 MHz to the PCS frequencies (2 GHz).

$$L_{50}(\text{urban})(\text{dB})=46.3+33.9 \log fc - 13.82 \log h_{te} - a(h_{re}) + (44.9 - 6.55 \log h_{te}) \log d + C_M \quad \text{Formula 7}$$

where, $a(h_{re})$ is determined by formulas 2, 3 and 4 above, depending upon the size of the city, and $$C_M = 0 \text{ dB, for medium sized city,}$$
$$\text{in suburban and rural areas, and}$$
$$= 3 \text{ dB, for urban area}$$

The above extensions to the Okumura-Hata outdoor path loss models 34 are restricted to the following ranges of parameters:

fc: 1500 MHz to 2000 MHZ $h_{te}$: 30 m to 200 m $h_{re}$: 1 m to 10 m d: 1 km to 20 km

Besides the outdoor component 32 of the overall path loss 26 determined by the above formulas, if present under the conditions of the identified tests scenario, the indoor component 36 of the overall path loss 26 should also be considered. If an identified test scenario assumes that the mobile terminal or cellular handset is located within a building or structure, the additional indoor component 36, of the overall path loss 26, that may occur as a result of the signal traveling within (and through) the building or structure should be accounted for. The indoor component 36 of the overall path loss 26 may be determined by making simplified assumptions as to the type of building materials used in urban, suburban and rural environments, and about the number of walls the signal penetrates to reach the outside of the building or structure. Once the building type and number of walls for a particular test scenario are estimated, the indoor component 36 of the overall path loss 26 for the identified test scenario's channel model 21, may be estimated by referring to indoor path loss models such as the one shown in FIGS. 6A–6D, which is discussed in more detail below.

To develop a channel model 21 for an identified test scenario, the Doppler shift 28 effects should be considered. A signal transmitted from a moving source undergoes a frequency shift due to the Doppler phenomenon. A prime example of when the Doppler shift 28 component of the channel model 21 should be considered is when a test scenario assumes a cellular call is being placed from a moving car. For test scenarios that assume the source of the signal transmission, e.g., the handset, is in motion, the Doppler shift 28 component of the channel model 21 may be determined by the following formula:

$$f_d = V_m f_c / c \quad \text{Formula 8}$$

Where $V_m$ is the velocity of the mobile terminal or cellular handset c is the velocity of light fc is the frequency of the signal emitted by the mobile terminal $f_d$ is the shift in the frequency fc By considering and developing the multi-path 24, overall path loss 26, and Doppler shift 28 components of the channel model 21 corresponding to an identified test scenario, the propagation impairment conditions of that test scenario can be simulated in the field. The channel model 21, developed for an identified test scenario, determines how the parameters of a signal may be modified to simulate the impairment conditions of the identified test scenario.

Referring to FIGS. 5A–5F, some of the ANSI/TIA/EIA JTC for PCS (hereafter referred to as the JTC) multi-path models are shown. The JTC multi-path models 30 may be used to develop the multi-path 21 (of FIG. 4) component of a channel model 21 (of FIG. 4) for an identified tests scenario. The JTC multi-path models 30 are defined by nine (9) propagation environment groups. The propagation environment groups identified are as follows: Indoor residential; Indoor office area; Indoor commercial area; Outdoor urban high-rise area with low antenna; Outdoor urban low-rise area with low antenna; Outdoor residential area with low antenna; Outdoor urban high rise area with high antenna; Outdoor urban/suburban low-rise area with high antenna; and, Outdoor residential area with high antenna. FIGS. 5A–5F includes tables representing six of these groups, as indicated on each table of FIG. 5. For each of these groups, the corresponding table expresses the values of the signal parameters, e.g., relative time delay, relative amplitude (relative power) and number of paths corresponding to three different profiles, namely, A, B and C (note that the JTC refers to the different profiles as "channels").

The three profiles represent three different multi-path models each with an associated probability of occurrence for the same propagation environment group. Thus, for the indoor office environment FIG. 5A, for example, the probabilities of occurrence of Profiles A, B, and C are 0.50, 0.45., and 0.05, respectively. Note that the probabilities of occurrences are not shown in the tables of FIG. 5. Generally speaking, Profiles A and B each have a probability of occurrence close to ½, while Profile C has a 0.05 probability of occurrence.

Several profiles or models are used due to the fact that each of the propagation environments are so broadly defined that it would be inaccurate to represent them with just a single profile. Alternatively, a large number of profiles may be undesirable for the reason that they may be difficult to manage. A suitable compromise, for example, are the three profiles described above with associated probabilities of occurrence.

A multi-path model may be expressed as consisting of several individual signals where each individual signal travels a different path in arriving at the same receiver. Each row of a table within the JTC multi-path models 30 represents an individual signal within the particular multi-path model. For example, consider FIG. 5A which includes information describing three multi-path environment models, respectively, specified as Profiles A, B, and C (or Channels A, B, and C). Profile A describes a first of these multi-path model as including three individual signals as specified by entries in rows 1–3 of FIG. 5A. Likewise, Profile B (or Channel B) of that table has entries in rows one through six, indicating that six individual signals comprise that "multi-path" model.

The entries in the first column of each profile (i.e., columns 1, 3, and 5) represent the relative time delay, in nanoseconds, of each individual received signal of the received multi-path signal. The first signal of row 1 for each multi-path profile is treated as the time baseline in regard to the relative time delays of the subsequent signals. The entries in the second column of each profile (i.e., columns 2, 4, and 6) represent the relative average power, in dB (decibels), of the individual received signals of the multi-path signal. Again, the first signal corresponding to row 1 for each-multi-path profile is treated as the power baseline regarding the relative powers of the subsequent signals.

Using FIG. 5A (indoor office area environment) as an example, Profile A (Channel A) shown in columns 1 and 2 can be used to represent a test scenario multi-path model including three individual signals (high probability of occurrence), as can be seen by the entries in rows 1–3 of those columns. The first signal (row 1) is assumed to arrive at a receiving antenna at time zero, shown in row 1, column 1, with a second signal (row 2) of the multi-path model arriving 50 nanoseconds after the first (row 2, column 1) and a third signal arriving 100 nanoseconds after the first (row 3, column 1). Referring to column 2 now, the average power of these three signals are 0 dB (row 1, column 2), –3.6 dB (row 2, column 2), and –7.2 dB (row 3, column 2) for first signal, second signal, and third signal, respectively.

As previously described above, each of the propagation environments are so broadly defined that several different test scenarios may be represented by the same propagation environments defined in FIGS. 5A–5F. By using different profiles, different multi-path models for different scenarios may correspond to the same propagation environment. It should be noted that if there are more than three test scenarios per propagation environment, some of the scenarios may be represented by the same multi-path profile. As generally known to those skilled in the art, this is a limitation of the JTC, and other models.

To select a particular model, some evaluation may be performed. For example, by examining the environment which defines the scenarios in a particular group, a qualitative best fit of the scenarios to profiles may be performed. As known to those skilled in the art, this includes an understanding of the environment, for example, as to how a signal is propagated from a transmitter to a receiver in a particular environment. For example, consider two urban class scenarios, a first at the intersection of streets and a second occurring mid-block. At an intersection, signals may be arriving at a point via more paths since signals may be coming down a street as well as deflecting off middle and corners of buildings. At mid-block, it may be expected that fewer signals are deflecting off the immediate vicinity of a building.

To comprehensively test a network-based LDT, a test plan containing a wide range of test scenarios covering the possible operational conditions and environments should be developed. For example, nine environmental groups as identified by the JTC may serve as an initial starting point for identifying the desired test scenarios. To identify and develop test scenarios, each environmental group can be further subdivided into subclasses to account for different test conditions such as mobility of the handset, type of building, type of urban structures, etc. One identified test scenario, for example, could be an "outdoor urban high-rise area with low antenna" (class), identified in FIG. 5B, of a medium sized city (subclass) with the handset located in an automobile traveling at approximately 20 mph (subclass within the first subclass) through a street intersection.

FIGS. 6A–6D is an example of indoor path loss models that may be used to estimate the indoor path loss component 36 (of FIG. 4) of the overall path loss 26 for channel model 21 corresponding to various test scenario. The data in FIGS. 6A–6D comes from T. S. Rappaport, Wireless Communications—Principles & Practice, p. 124, Prentice Hall, 1996. As mentioned above, the indoor component 36 of the overall path loss 26 may be determined by making simplified assumptions as to the type of building materials used in urban, suburban and rural environments, and about the number of walls the signal penetrates to reach the outside of the building or structure. Once the building material type and the number of walls to be penetrated for a given test scenario are identified, data models such as the one shown in FIGS. 6A–6D can be consulted to estimate the indoor path loss 36 for the given test scenario. The rows of column 1 of FIGS. 6A–6D represent the different types of materials modeled, and the entries of columns 2 represent the amount of signal loss, in dB (decibels), that may be expected as a signal passes through the materials listed in column 1.

For example, if an identified test scenario calls for a signal to penetrate a single concrete block wall, the test scenario's indoor path loss component 36 may be estimated, according to FIG. 6B, to be a loss of 13–20 dB. This estimate of the indoor path loss component 36 can be obtained from FIG. 6B by locating the test scenario's building material type as listed in column 1 and using the path loss values listed in column 2 corresponding to that building material. To illustrate the example, the "concrete-block wall" material type can be found in row 25, column 1 of FIG. 6B, with a corresponding estimated indoor path loss of 13–20 dB as found in row 25, column 2.

It should be noted that ideally it may be desirable to correct for differences in frequency between that of the handset signal and those used to develop the data of FIGS. 6A–6D. However, in this particular embodiment, the values for Table 6A–6D may be used and an assumption may be made that the differences in frequency are insignificant.

Figure 7:
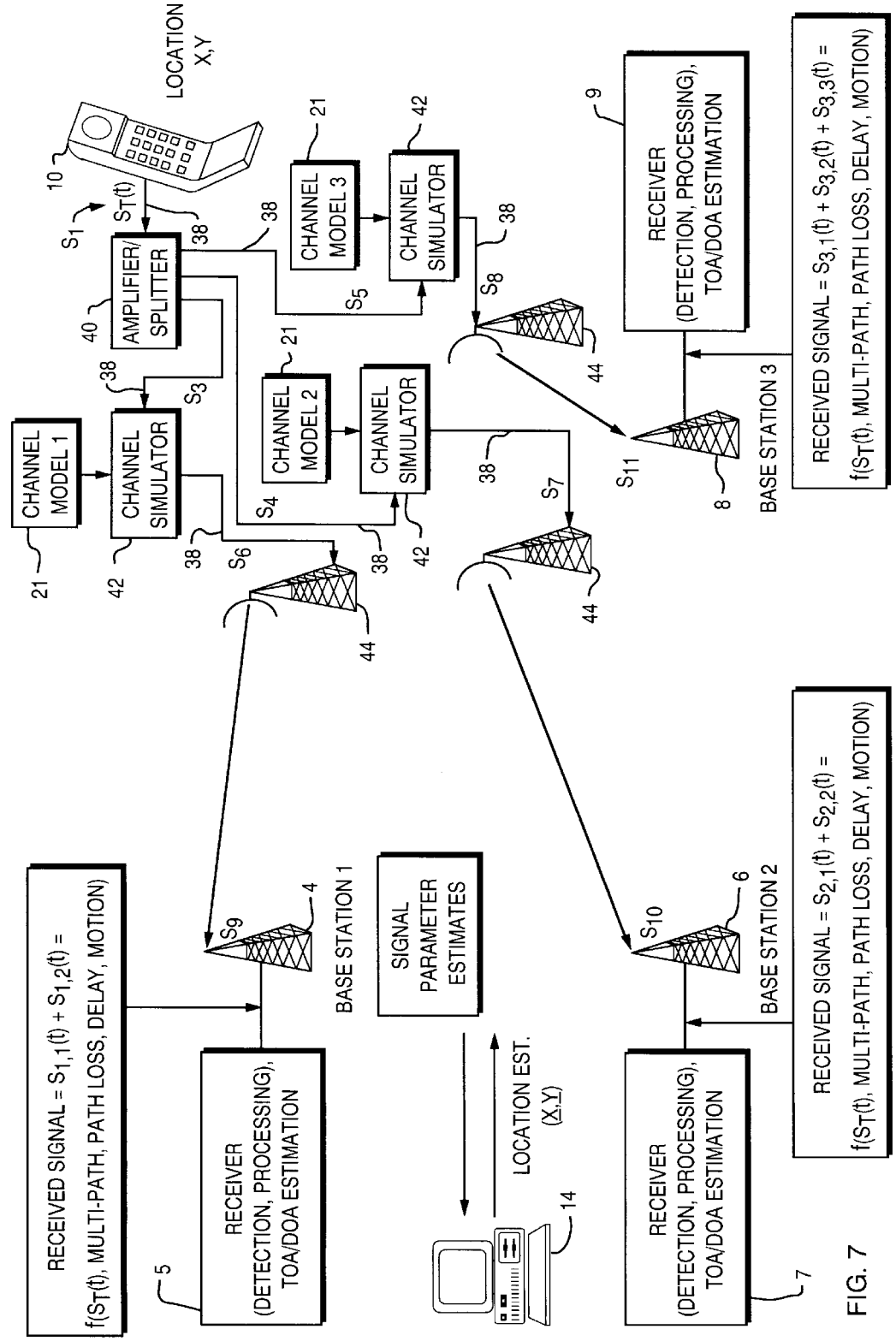
FIG. 7 is an example of an embodiment of a wireless field trial simulator and its associated hardware for testing network-based location determination technologies within a single test area.

Referring to FIG. 7, shown is one embodiment of a system for testing a network-based LDT within the selected test area. Because the network-based LDT shown includes three receivers, three channel models 21 are used to simulate the desired test scenarios in this embodiment. The signal path cables 38 shown are of a conventional type as understood by those skilled in the art. The handset 10 is connected, via cable 38, to an amplifier/splitter 40 which further connects via cables 38 to three channel simulators 42. Persons skilled in the art will recognize that the amplifier/splitter 40 may be of the common type commercially available for the purposes of splitting and amplifying signals within the radio frequencies, such as those manufactured by California Microwave for example. Additionally, persons skilled in the art will recognize that the channel simulator 42 may be of the common type commercially available for the purposes of modifying the parameters of signals within the radio frequencies. The Hewlett Packard 11759C RF Channel Simulator and Telecom Analysis Systems 4500 Flex4PLUS PF Channel Emulator may be good candidates for use as the channel simulator 42. The channel simulators 42 are each individually connected via cable 38 to a transmitting antenna 44. The transmission antennas 44 may be commercially available omni-directional, or directional antennas, such as those manufactured by Andrews or Antenna Specialist for example.

The input handset 10 signal $S_1$ is split by the amplifier/splitter 40 into the output signals $S_3$, $S_4$ and $S_5$. These output signals may be amplified by the amplifier/splitter 40 to adjust for the loss of signal strength that may occur from splitting the original signal, $S_1$. The $S_3$, $S_4$ and $S_5$ signals are then modified by the channel simulators 42 according to the appropriate channel models 21 developed to simulate the desired test scenario. Note that the channel simulator is used to modify the signal in so far as the multi-path (24) and Doppler shift (28) components of the channel model (21) are concerned. The over path loss modification is done by employing amplifiers/attenuators at receivers and transmitterst but preferrably only at the receivers. In FIG. 7, for example, the signal $S_3$ is modified by a channel simulator 42 in accordance with the parameters of the channel model 21 developed to simulate the impairment conditions estimated to exist between the handset 10 and the network-based LDTs base station 1 receiver for an identified test scenario. Signals $S_4$ and $S_5$ are similarly modified by channel simulators 42 to simulate the impairment conditions estimated to exist between the handset 10 and the network-based LDT's base station 2 and 3 receivers, respectively, for the identified test scenario. The output signals (i.e., modified signals) of the channel simulators 42 are represented as $S_6$, $S_7$, and $S_8$, corresponding to the pre-modified signals $S_3$, $S_4$ and $S_5$, respectively. The $S_6$, $S_7$, and $S_8$ signals are transmitted to the receiving antennas 4, 6, and 8, respectively, by the transmission antennas 44. As the transmitted signals (i.e., $S_6$, $S_7$, and $S_8$) travel to the appropriate receiving antennas, the parameters of these signals are affected by the naturally-occurring propagation impairment conditions found within the selected test area. The signals received at receiving antennas 4, 6, and 8, are shown as $S_9$, $S_{10}$, and $S_{11}$, respectively.

The network-based LDT estimates the caller's location by processing the received signals $S_9$, $S_{10}$, and $S_{11}$ through the signal receiver/processors 5, 7, and 8, respectively, and the central location determination estimator processor 14 (P.D.E.). The performance of the network-based LDT under the simulated test scenario conditions and environment (i.e., the simulated propagation impairment conditions) can then be evaluated by comparing the estimated caller location with the known geographic location of the caller.

The following is a more detailed description of how the wireless field trial simulator is used within a single test area to comprehensively test a network-based LDT. To use the wireless field trial simulator system to test a network-based LDT, propagation impairment conditions for test scenarios are identified and corresponding channel models are developed for each identified test scenario. The formulas and modeling data previously described may be used to determine the multi-path, path loss and Doppler shift components of the channel models for each identified test scenario. When testing a network-based LDT within a chosen test area, a handset or mobile terminal signal may be modified according to the developed channel models to simulate the propagation impairment conditions of an identified test scenario. After the original handset signal has been modified, it is then transmitted to the network-based LDT receivers located within the chosen test area.

As the modified signals travel to the receiving antennas of the network-based LDT receivers, however, these signals are still affected by the propagation impairment conditions that naturally occur in the chosen test area. As discussed above, the channel models are developed to simulate, by modifying the handset signal, the propagation impairment conditions of an identified test scenario. Because it is assumed, as discussed earlier, that the transmitter-receiving antenna(s) separation distance(s) (i.e., the distance between their geographic locations) of the identified (simulated) test scenario and that of the system actually tested at the chosen test area are identical, it follows that the propagation impairment conditions of the actual test location and that of the identified test scenario are, therefore, also identical. The propagation impairment conditions naturally occurring at the chosen test area, however, are not accounted for in the modeling of the identified test scenarios nor in the development of their corresponding channel models. The channel models are developed based upon the propagation impairment conditions that are expected to exist in an identified test scenario, and do not take into account the actual propagation impairment conditions found in the chosen test area. To accurately simulate the conditions and environment of an identified test scenario, therefore, the propagation impairment conditions that naturally occur at the chosen test area are considered and accounted for.

The propagation impairment conditions that naturally occur at a chosen test area can best be "accounted" for by selecting a test area with minimal propagation impairment conditions, and by correcting for those propagation impairment conditions that are present. Several steps can be taken to minimize for the propagation impairment conditions that occur naturally at the selected test location. First, to minimize the number of naturally occurring multi-path signals the selected test area should have direct line-of-sights between the transmitting antennas and the network-based LDT's receiving antenna(s). Secondly, if any naturally occurring multi-path signals do exist at the chosen test area they should be engineered to be weak so that they will have a minimal impact on the wireless field trial simulator's ability to accurately simulate a given test scenario. To determine the significance of the multi-path signals naturally occurring between the transmitting and receiving antennas, a channel sounder can be used to analyze the signal propagation. The existence of naturally occurring multi-path signals can further be reduced by using separate directional transmitting antennas instead of using regular omni-directional antennas.

Unlike multi-paths, the signal path losses that naturally occur within the selected test area cannot be minimized and, therefore, are accounted for when network-based LDT are tested in accordance with the invention. One way to correct for the naturally occurring signal path losses is to use amplifiers to apply the necessary gain at the LDT receivers, as described below. This can be done, for example, in the following ways. First, given the conditions and environment for an identified test scenario, the path loss of a signal transmitted from a handset or mobile terminal to a receiving antenna(s) is estimated according to the formulas and data models described above. The estimated signal path loss value corresponding to each LDT receiver within the network-based LDT can be expressed as PL $A_{est}$, PL $B_{est}$ and PL $C_{est}$, where, for example, PL $A_{est}$ represents the path loss of a signal traveling from the handset to one receiver, and PL $B_{est}$ represents the path loss of a signal traveling from the handset to another receiver, and the like.

Then without modifying the signals, the wireless field trial simulator configuration, e.g. the system depicted in FIG. 7, is operated at the chosen test location and the actual path losses of signals transmitted from the handset to the receivers of the network-based LDT are measured using readily available signal power measurement instruments. If there are difficulties in using a cellular signal, a signal in the neighboring ISM band to measure the actual signal losses may be used. These measured signal path losses can be represented as PL $A_{meas}$, PL $B_{meas}$ and PL $C_{meas}$, where PL $A_{meas}$ represents the measured path loss of a signal traveling from the handset to a receiver, and PL $B_{meas}$ represents the path loss of a signal traveling from the handset to another receiver, etc. Furthermore, the signal path loss that occurs due to the introduction of the hardware required to conduct the wireless field trial simulation, e.g., the simulator, receiving antenna, and cables, should be accounted for. These losses can be represented as $PL_{sim}$, where $PL_{sim}$ is the path loss that occurs as the signal travels through the hardware of the wireless field trial simulator.

The handset signal is input into the channel simulator where it is modified as per the multi-path and doppler shift components of the channel model developed for an identified test scenario. If the regular handset type of omni-directional antenna is used, for example, to transmit the modified signal(s), the gain added at a receiver can be adjusted, to account for the path loss naturally occurring at the chosen test location, according to the following formula:

$$\text{Gain Applied at Receiver } A(dB) = -PL\ A_{est} + PL\ A_{meas} + PL_{sim} \quad \text{Formula 9}$$

where A represents a receiver within a network-based LDT and the path losses are positive values.

For a network-based LDT including three receivers, for example, the amount of gain to be applied at each receiver may be expressed as follows:

$$\text{Gain Applied at Receiver } A(dB) = -PL\ A_{est} + PL\ A_{meas} + PL_{sim}$$

$$\text{Gain Applied at Receiver } B(dB) = -PL\ B_{est} + PL\ B_{meas} + PL_{sim}$$

$$\text{Gain Applied at Receiver } C(dB) = -PL\ C_{est} + PL\ C_{meas} + PL_{sim}$$

where A refers to the first receiver, B refers to the second receiver, and C refers to the third receiver.

Alternatively, if separate transmitting directional antennas are used instead of an omni-directional antenna to minimize the affect of naturally occurring multi-path at the receivers, the gain can be adjusted to account for the signal path losses naturally occurring at the chosen test location. The gain is determined by the following:

$$\text{Gain Applied at Receiver Antenna } A(dB) = -PL\ A_{est} + PL\ A_{meas} + PL_{sim} - \text{Dir. Ant. Gain } A \quad \text{Formula 10}$$

where Receiver A represents a receiver within a network-based LDT, and Dir. Ant. Gain A represents the amount of gain of the directional antenna which is directing the transmission of a signal to Receiving Antenna corresponding to Receiver A.

For a network-based LDT consisting of three receiver with three corresponding directional transmitting antennas, for example, the amount of gain to be applied at each receiving antenna could be expressed as follows:

$$\text{Gain Applied at Receiver Antenna } A\ (dB) = -PL\ A_{est} + PL\ A_{meas} + PL_{sim} - \text{Dir. Ant. Gain } A \quad \text{Formula 10}$$

$$\text{Gain Applied at Receiver Antenna } B\ (dB) = -PL\ B_{est} + PL\ B_{meas} + PL_{sim} - \text{Dir. Ant. Gain } B$$

$$\text{Gain Applied at Receiver Antenna } C\ (dB) = -PL\ C_{est} + PL\ C_{meas} + PL_{sim} - \text{Dir. Ant. Gain } C$$

Lastly, to avoid the need to account for any naturally occurring Doppler frequency shifts within the chosen test location, the handset/transmitting antennas of the wireless field trial simulator system may be held stationary when simulating the test scenarios. For test scenarios requiring the handset/caller to be in motion, the Doppler frequency shift that would occur under such conditions may be simulated by using formula 8 above in the channel simulation (42) to develop the appropriate Doppler shift component of a channel model.

Some additional considerations for conducting the wireless field trial simulator will now be briefly discussed. It is generally accepted that the base stations, and more specifically, the receiving antennas, for wireless communication systems are more closely spaced in urban and suburban areas than in rural areas. Since the base stations in urban areas are closely spaced, the distances between a caller/handset and a network-based LDT's receiving antennas are typically going to be shorter than they would be for rural systems. Because of this, it is likely that when the selected test area is a rural one where the base stations are far apart, that the estimated path loss, PL $A_{est}$, for example, when simulating an urban (or suburban) scenario with an equal distance of that of the actual test area may be significantly greater (assuming a positive number in dBs) than the amount of path loss that would be expected in a typical urban scenario. In these types of cases, the shorter distances that would be typical of urban systems should be used when calculating the estimated path loss (e.g., PL $A_{est}$) for the simulated urban scenario.

The introduction of additional signal time delays due to the wireless field trial simulator's hardware should be considered when configuring the system's hardware, particularly when testing TDOA-type network-based LDTs. The accuracy of a TDOA location determination technology depends upon its ability to estimate the delay experienced by the cellular signal in traveling from the handset to the receiving antennas. The process of simulating the test scenarios results in additional signal delays, mostly due to the inclusion of the simulator and cables. The introduction of these additional signal delays, if not managed properly, could significantly alter these system's ability to accurately determine a caller's location, and thereby defeat the purpose of the invention. (If the wireless field trial simulator system affects the underlying performance of the network-based LDT, then the results obtained for the simulated test scenarios are not representative of the network-based LDT's true performance capabilities.) The effects on the performance of the network-based LDT can be mitigated by ensuring that additional signal time delays introduced by the wireless field trail simulator are the same for each signal that is received by the LDT receivers. Therefore, when testing LDT's that use TDOA for its location determination algorithm, it is important to ensure that the difference in the invention-induced delays for each signal arriving at a receiving antenna is not significant.

The following are two examples of how the wireless field trial simulator can be implemented to conduct field tests of network-based location determination technologies.

EXAMPLE 1

The first identified test scenario is a suburban environment (class), with a stationary handset transmitter situated in the basement of a wood frame building (subclass) located in a residential neighborhood of 1–2 story buildings (subclass). It is assumed that the network-based LDT being tested is of the TDOA-type. Hence to determine the caller's location, the handset signal is received at a minimum of three LDT receiver. The handset is also placed at a location with known geographic location. The three receivers are also placed at known geographic locations. These receiver positions will most likely be co-located with the existing cellular/PCS base stations.

The channel models corresponding to the propagation impairment conditions of this test scenario are developed first. To develop the channel models, the path in which the signal(s) travel and the conditions and environment that affect the signal(s) are examined. The signal emanating from the handset terminal has to first penetrate the basement ceiling and then at least the outer (building frame) wall before it can get to the outside of the building. In the process it undergoes path losses which are referred to as an indoor path loss. Once the signal(s) reaches the outside of the building and travels to the receiving antennas, it experiences outdoor path loss and multi-path effects.

Referring back to FIG. 4, the multi-path component 24 of the channel models 21 may be developed as follows. Since the identified test scenario belongs to the suburban class and is in a residential neighborhood, Table 5 or Table 7 of FIG. 5 may be used. If the scenario, for example, further specifies a spread out neighborhood, then most likely, the antennae at the base stations would be low rise. This may suggest using Table 5 rather than Table 7. It should be noted that since the signal is coming from inside a building, it may be assumed that the number of multi-path components to a signal received at a receiver antenna will be larger than if the signal came from a handset on the outside of a building. Profile C may be selected in this instance since Profile C has the largest number of multi-path components, i.e., 10.

Profile C of that table shows a multi-path environment consisting of 10 individual signals, as seen by the entries in rows 1–10 of those columns. For each of these signals the relative time delays (column 3) and average power (column 4) are given. For example, the fourth signal of this multi-path environment would arrive at a receiving antenna 475 nanoseconds after the first signal, as seen in row 4, column 3, and would have an average power of −1.4 dBs relative to the first signal, as seen in row 4, column 4.

The channel simulator provides a way for inputting, via a computer program, for example, included in the simulator, the number of multi-path components the channel simulator is simulating. The computer program also allows for specifying the relative power that each component will have with respect to the reference signal (i.e., at 0 seconds time delay). The channel simulator also allows for specifying the amount of Doppler shift for each signal. Note that the amount of Doppler shift specified for each signal implies the shift for all of the multi-path components associated with one signal since the components are each affected by the same Doppler shift in frequency.

The overall path loss 26 of these signal as they travel to the receiving antennas, including an indoor and an outdoor path loss, should be determined. The indoor loss component 36 for the identified tests scenario would be 40–50 dB, obtained from FIG. 6A, row 5, column 2 corresponding to the "Loss from one floor and one wall." For the outdoor component 32 for the identified test scenario, formulas 1, 2, and 5 and for the Okumura-Hata models described above may be used. Formula 5 is used because the scenario belongs to the suburban class. Formula 1 is used because Formula 5 requires it. Finally, Formula 5, requires a correction factor from Formulae 2–4. Since a medium/small city is more representative of a suburban area than a large city, Formula 2 is selected from amongst Formulae 2–4. For distance, d, the actual distance between the handset and each receiving antenna of the network-based LDT located at the chosen test area may be used. The actual overall path loss between the handset and each receiving antenna should be measured, e.g., PL $A_{meas}$, PL $B_{meas}$ and PL $C_{meas}$. The amount of (artificial) amplification (positive or negative) to be applied to the receiving antennas is determined from the loss which occurs naturally (e.g. PL $A_{meas}$) and the loss that is expected for the particular test scenario and for the actual distance between terminal and each receiving antenna (e.g., PL $A_{est}$). The amount of gain to be applied to a particular receiving antenna is determined by formulas 9 or 10 above, depending upon the hardware configuration chosen.

Since the identified test scenario calls for the handset to be stationary, no Doppler frequency shift 28 simulation is required.

Once the components of the channel models have been developed the hardware of the wireless field trial simulator may be configured.

Referring back to FIG. 7 as an example, the handset 10 is connected via a cable 38 to a amplifier/splitter 40 which splits the signal $S_1$ into three signals, $S_3$, $S_4$, and $S_5$. Each signal will go to the input of a channel simulator 42. The multi-path parameters on each channel simulator 42 is then programmed in accordance with the multi-path model described above. For this example test scenario, the channel simulator 42 would be programmed to reproduce the ten individual-like signals with appropriate time delays and average powers as discussed above. The signal coming out of the output of each channel simulator 42 (e.g., $S_6$, $S_7$, or $S_8$) is sent over a cable 38 to a transmitting antenna 44 (for a directional antenna) pointed in the direction of the corresponding receiver antennas 4, 6, or 8. The signals $S_9$, $S_{10}$, and $S_{11}$ received at the receiving antennas 4, 6, and 8, respectively will need to be amplified or attenuated in accordance with the formulas 9 or 10 as discussed above.

EXAMPLE 2

The second test scenario belongs to the urban scenario class, inside a car scenario sub-class, with the mobile handset terminal placed within a car which is moving at 10–25 mph on a 4 lane street located within an urban canyon (25–50 story buildings) during regular weekday office hours. Again it is assumed that the LDT being tested is of the TDOA-type. Hence to determine the caller's location, the mobile terminal signal is received at a minimum of three LDT receivers. The handset and receivers are placed at known geographic locations.

The channel models corresponding to the propagation impairment conditions of this test scenario are developed first. To develop the channel models, the path in which the signal(s) travel and the conditions and environment that affect the signal(s) are examined. The radio signal emanating from the mobile handset has to first penetrate the body of the car. It may be assumed that this "indoor" loss is minimal and, therefore, can be ignored. Once the signal reaches outside the car and travels to the receiving antennas, it undergoes outdoor path loss as well as multi-path effects.

Referring back to FIG. 4, the multi-path component 24 of the channel models 21 may be developed as follows. Since the identified test scenario belongs to the urban class with high-rises, the multi-path model of Table 3 or Table 6 of FIG. 5 may be used. Since the scenario is at the street level, this area will most probably be served by base station antennae at street level. i.e., a relatively lower antenna. This suggests that Table 3 be used. Signals coming from a handset in a car in the street will have many more deflections from both sides of the street en route to the receiving antenna when compared to a signal from a handset, for example, in the hands of a pedestrian on the sidewalk. Profile B or C may be used. However, a signal coming from the inside of buildings may have more components than a signal from the inside of a car. Profile B may be a better selection than Profile C in this instance. Profile C may be a better selection for an indoors scenario, for example, in which the handset is inside buildings in an urban high-rise environment.

Profile B of that table shows a multi-path environment consisting of 8 individual signals, as seen by the entries in rows 1–8 of those columns. For each of these signals, the relative time delays (column 1) and average power (column 2) are given. For example, the third signal of this multi-path environment would arrive at a receiving antenna 250 nanoseconds after the first signal, as seen in row 3, column 1, and would have an average power of −13 dBs relation to the first signal, as seen in row 3, column 2. As previously described above, these numbers obtained from the tables may be input to the channel simulator.

Next, the overall path loss 26 of these signal as they travel to the receiving antennas, consisting of an indoor and an outdoor, should be determined. The "indoor" path loss of the signal traveling through the car is assumed to be negligible, and therefore can be neglected. For the outdoor component 32 for the identified test scenario, formulas 1–4 for the Okumura-Hata models described above may be used. For distance d, the actual distance between the handset and each receiving antenna of the network-based LDT located at the chosen test area may be used. The actual overall path loss between the handset and each receiving antenna should be measured, e.g., PL $A_{meas}$, PL $B_{meas}$ and PL $C_{meas}$. The amount of (artificial) amplification (positive or negative) to be applied to the receiving antennas is determined from the loss which occurs naturally (e.g. PL $A_{meas}$) and the loss that is expected for the particular test scenario and for the actual distance between terminal and each receiving antenna (e.g., PL $A_{est}$). The amount of gain to be applied to a particular receiving antenna is determined by formulas 9 or 10 above, depending upon the hardware configuration chosen.

The Doppler shift component 28 can be determined by using formula 8 above to determine the amount of Doppler frequency shift that result from the car traveling at an assumed speed of between 10–25 mph.

Once the components of the channel models have been developed the hardware of the wireless field trial simulator may be configured. Again using FIG. 7 as an example, the handset 10 is connected via a cable 38 to an amplifier/splitter 40 which splits the signal emanating from the handset 10 into 3 signals. Each signal will go to the input of a channel simulator 42. The parameters of each channel simulator 42 is then programmed in accordance with the multi-path and Doppler shift components of the channel models 21 described above. For this example test scenario, the channel simulator 42 would be programmed to reproduce the six individual-like signals with appropriate time delays and average powers as discussed above with the appropriate Doppler shift as determined by formula 8 above. The signal coming out of the output of each channel simulator 42 is sent over a cable 38 to a transmitting antenna 44 (for a directional antenna) pointed in the direction of the corresponding receiver antennas 4, 6, or 8. The signals received at the receiving antennas will need to be amplified in accordance with the formulas 9 or 10 as discussed above.

Figure 8:
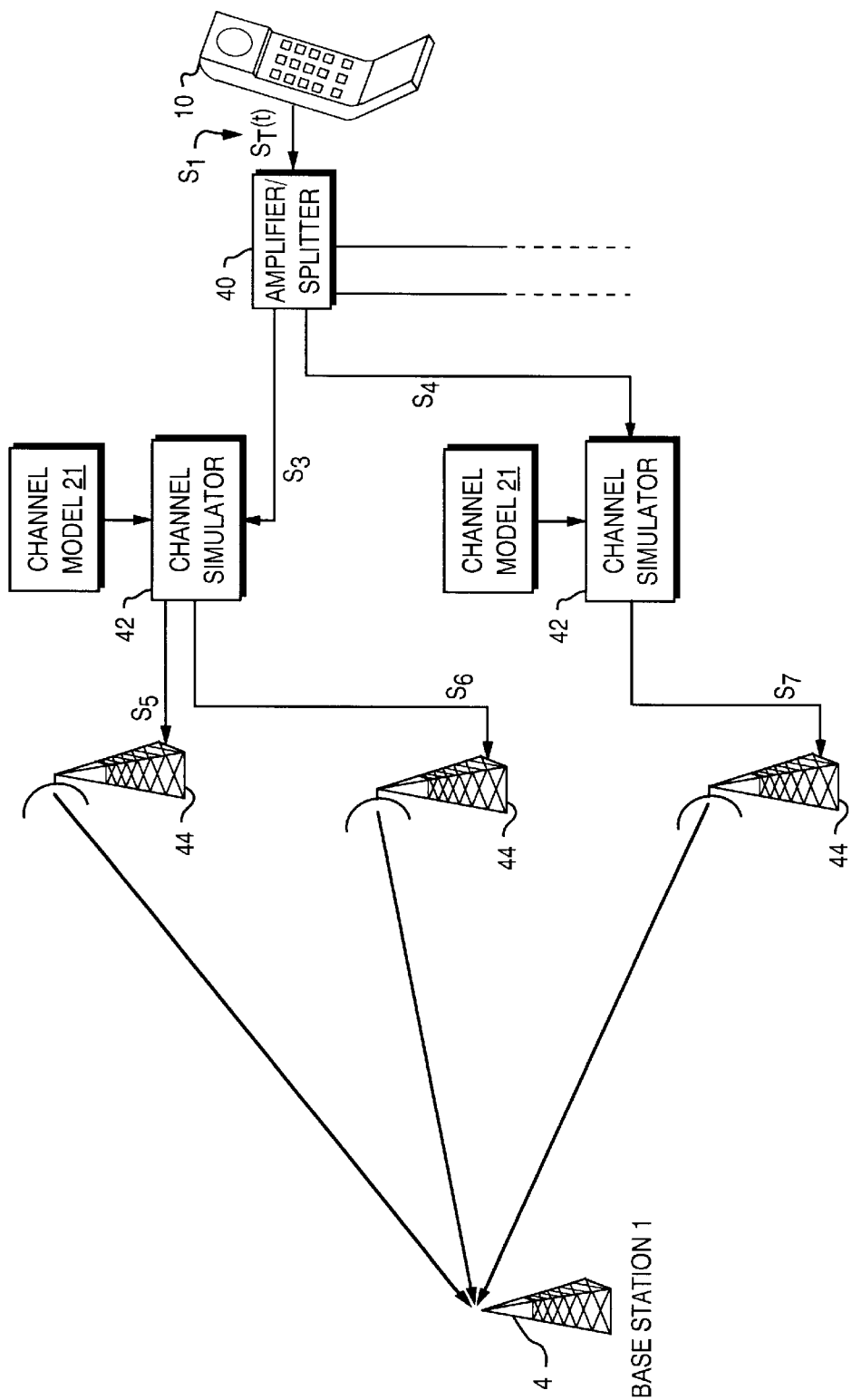
FIG. 8 is an example of another embodiment of a wireless field trial simulator and its associated hardware for testing network-based location determination technologies within a single test area.

Referring to FIG. 8, shown is an alternate embodiment of a wireless field trail simulator for testing a network-based LDT at a selected test area. Note that the hardware configuration of FIG. 7 allows for simulation of multi-path in terms of number of paths, relative delay and relative power. FIG. 8 hardware configuration allows for simulation of an additional parameter in the multi-path model, that of direction of arrival. FIG. 8 illustrates an example of a system where three modified multi-path signals are transmitted via three transmission antennas 44 and arrive at three different angles to the receiving antenna 4 of base station 1 to simulate the propagation impairment conditions of an identified test scenario. The handset 10 $S_1$ signal is input into amplifier/splitter 40. Signals $S_3$ and $S_4$ from the amplifier/splitter 40 are directed to channel simulators 42. Additional signals may be directed from the amplifier/splitter 40 to other channel simulators 42 to simulate the propagation impairment conditions of the desired test scenario as needed. As discussed above, channel models 21 corresponding to each base station of the network-base LDT system may be developed. Modified signals $S_5$, $S_6$ and $S_7$ are transmitted to the receiving antenna 4 of base station 1 LDT receiver by transmitting antennas 44 and arrive at three different angles.

Figure 9:
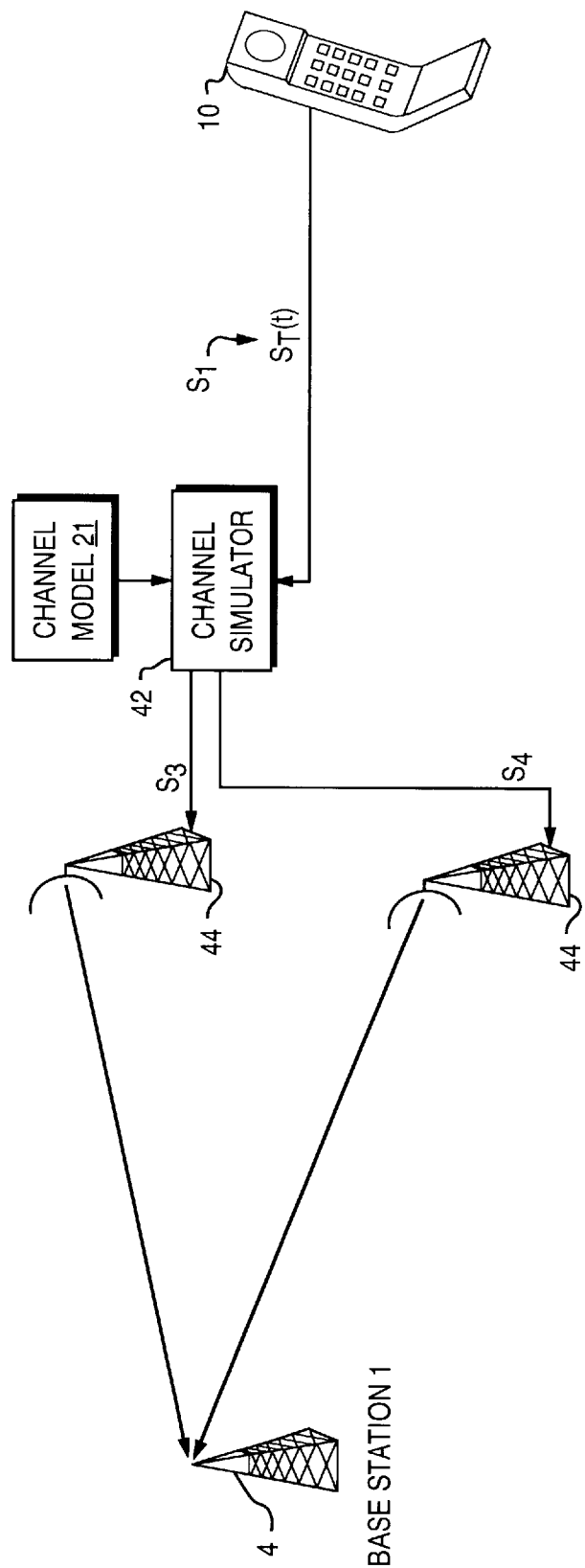
FIG. 9 is an example of another embodiment of a wireless field trial simulator and its associated hardware for testing network-based location determination technologies within a single test area.

Referring to FIG. 9, shown is yet another embodiment of a wireless field trial simulator for testing a network-based LDT at a chosen test area. A network-based LDT that utilizes Location Fingerprinting, which requires only one base station, could be tested with the system illustrated in FIG. 9, since in addition to simulating multi-path in terms of number of paths, relative delay and relative power it also simulates different directions/angles of arrival for the multi-path signal. The handset 10 $S_1$ signal is input directly into the channel simulator 42 without utilizing an amplifier/splitter. The input signal $S_1$ is modified by the channel simulator 42 according to the channel model developed for an identified test scenario. The modified output signals, $S_3$ and $S_4$, of the channel simulator 42 are transmitted to the receiving antenna 4 of the base station by transmission antennas 44. While two transmission antennas are shown in FIG. 9, one antenna may suffice depending upon the propagation impairment conditions to be simulated for a given test scenario, e.g., direction/angle of arrival for the multi-path components of the same signal.

The foregoing principles and techniques may be applied to test a variety of other wireless communication systems. The foregoing techniques may also be used for a comprehensive testing of network type of handset-based LDT. In this instance, rather than modify a signal transmitted from a handset and received by an LDT's receiver, the signals transmitted by the base stations and received by the handset are modified.

In yet another embodiment, the foregoing may also be used for testing of a hybrid type of LDT in which signals are transmitted from both the handset to the base station and the signals transmitted from the base stations to the handset are used in the location determination. The techniques described herein may be used to modify all the foregoing signals, for example.

For hybrid type of LDTs which also use signals transmitted by GPS satellites, the techniques described herein may be modified, as known to those skilled in the art, to include additional hardware which captures a signal, modifies according to a channel model, and the retransmits the signal. Note that this channel model, as known to those skilled in the art, as used with satellite transmission differs from channel models as described herein to apply to non-satellite transmissions. Similarly, GPS assisted handset based LDTs may be tested in accordance with the foregoing principles and techniques.

It should be noted that a portion or all of the calculation associated with the channel models, i.e., the multi-path models, the Doppler shift and the indoor and outdoor path loss calculations may be implemented in software, such as using a commercially available programming language that is used to produce machine executable code that executes in conjunction with the channel simulator. The final calculations related to the models are used as inputs to the channel simulator. Additionally, software may also be used to use as inputs parameters describing the various scenarios and generate the channel models, for example, either interactively using a graphical user interface on the channel simulator, or after certain values are input to the channel simulator.

Generally, the techniques described herein may be used to simulate conditions that affect signal transmission and also having an actual physical or geographic location which is not simulated. This may be used in testing wireless communication systems, including cellular location equipment. Additionally, these techniques may be used to simulate and test voice transmission signal impairment using the field trial simulator described herein regardless of whether a location is being determined. In other words, the foregoing principles and techniques may be used to test, for example, voice and data transmission quality in a variety of wireless communication systems as well as the accuracy of location determination technologies. The wireless communication systems may include, but are not limited to, wireless broad band systems including point-to-point and point to multi-point systems, as well as Personal Communication Systems (PCS), which use different frequencies than those included in the foregoing descriptions for signal receiving and transmission. As known to those skilled in the art, the foregoing descriptions may be easily adapted for use with these and a variety of other wireless communication systems operating at different frequencies as may be included in other embodiments incorporating principles and techniques described herein. For example, with broadband (spectrum) system, the foregoing Okumura-Hata models and associated formulae may be readily expanded, as known to those skilled in the art, to include the frequencies of this application as used in the broadband spectrum.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A method of testing network-based location determination technologies within a single test area in the field comprising:

determining a site within which signal transmitter and receiver locations are known;

defining scenarios representative of propagation impairment conditions;

modifying, within the site, parameters of transmitted and received signals to simulate propagation impairment conditions based on the defined scenarios;

executing location determination technologies to estimate a geographic location of a transmitted signal; and evaluating the performance of location determination technologies by comparing the estimated geographic location to the known transmitter location.

2. A method of testing network-based location determination technologies as recited in claim 1, wherein said simulating propagation impairment conditions further includes:
   simulating the conditions and environment of all possible geographic areas.

3. A method of testing network-based location determination technologies as recited in claim 1, wherein simulating propagation impairment conditions of identified test scenarios comprises:
   modifying signal parameters to simulate multi-path effects;
   modifying signal parameters to simulate path loss effects; and
   modifying signal parameters to simulate Doppler frequency shift effects.

4. A method of modifying signal parameters to simulate path loss effects as recited in claim 3, wherein the desired conditions and environments are simulated by:
   utilizing the Okumura-Hata path loss models to estimate the outdoor path loss effects of an outdoor environment; and
   utilizing indoor path loss models to estimate the indoor path loss effects of an indoor environment.

5. A method of testing network-based location determination technologies within a single test area in the field comprising:
   determining a site within which signal transmitter and receiver locations are known;
   defining scenarios representative of propagation impairment conditions;
   generating a signal within the site;
   modifying, within the site, parameters of said signal to simulate propagation impairment conditions based on the defined scenarios;
   transmitting said modified signal within the site;
   receiving said modified signal; and
   executing location determination technologies to estimate a geographic location of the modified signal.

6. A method of testing network-based location determination technologies as recited in claim 5, wherein generating a signal includes providing a handset transmitter.

7. A method of testing network-based location determination technologies as recited in claim 5, wherein modifying said signal includes providing a signal splitter to split said signal.

8. A method of testing network-based location determination technologies as recited in claim 5, wherein modifying said signal includes providing a channel simulator to modify said signal.

9. A method of testing network-based location determination technologies as recited in claim 5, wherein modifying said signal includes the step of providing an amplifier to modify said signal.

10. A method of testing network-based location determination technologies as recited in claim 5, wherein transmitting said modified signal includes providing an omni-directional antenna to transmit said modified signal.

11. A method of testing network-based location determination technologies as recited in claim 5, wherein transmitting said modified signal includes providing a directional antenna to transmit said modified signal.

12. A system for testing network-based location determination technologies within a single test area in the field comprising:
   means for determining a site within which signal transmitter and receiver locations are known;
   means for defining scenarios representative of propagation impairment conditions;
   means for generating a signal within the site;
   means for modifying, within the site, parameters of said signal to simulate propagation impairment conditions based on the defined scenarios;
   means for transmitting said modified signal within the site;
   means for receiving said modified signal; and
   means for executing location determination technologies to estimate a geographic location of the modified signal.

13. A system for testing network-based location determination technologies as recited in claim 12, wherein said means for modifying said signal includes means for providing a channel simulator to modify said signal.

14. A system for testing network-based location determination technologies within a single test area in the field comprising:
   a handset to generate a signal;
   a channel simulator to modify said signal to simulate propagation impairment conditions of a desired test scenario;
   a transmitting antenna for transmitting said modified signal;
   a receiving antenna for receiving said modified signal; and
   a location determination device for estimating a geographic location of the modified signal.

15. A means for testing network-based location determination technologies within a single test area in the field comprising:
   determining a site within which signal transmitter and receiver locations are known;
   defining scenarios representative of propagation impairment conditions;
   generating a signal within the site;
   modifying, within the site, parameters of said signal to simulate propagation impairment conditions based on the defined scenarios;
   transmitting said modified signal within the site;
   receiving said modified signal; and
   executing location determination technologies to estimate a geographic location of the modified signal.

16. A method of testing a network-based location determination system to locate the source of a transmission signal comprising:
   defining a set of test parameters representing test conditions of a location determination technology, said set of test parameters including one or more parameters describing propagation impairment conditions of defined scenarios and also including one or more parameters corresponding to a geographic location;
   modifying parameters of a transmission signal to simulate said one or more parameters corresponding to said propagation impairment conditions;
   locating the source of the transmission signal at a physical site at which said transmission signal is transmitted;
   transmitting said transmission signal;
   executing said location determination technology to estimate a geographic location of said transmission signal that corresponds to said physical site; and
   evaluating the performance of location determination technologies by comparing the estimated geographic location to the physical site.

17. The method of claim 16, wherein hardware simulates said one or more parameters describing said propagation impairment conditions, and said one or more parameters corresponding to a geographic location being non-simulated.

18. The method of claim 16, further including:
using a channel simulator to simulate said one or more parameters describing said propagation impairment conditions.

19. A method of testing a wireless communication system within a single test area in the field comprising:
providing a wireless communication system;
determining a site within which wireless signal transmitter and receiver locations are known;
defining scenarios representative of propagation impairment conditions;
modifying, within the site, parameters of transmitted and received wireless signals to simulate propagation impairment conditions based on the defined scenarios;
executing location determination technologies to estimate a geographic location of a wireless transmitted signal; and
evaluating the performance of location determination technologies by comparing the estimated geographic location to the known transmitter location.

20. The method of claim 19, wherein said simulating propagation impairment conditions further includes:
simulating the conditions and environment of all possible geographic areas.

21. The method of claim 19, wherein simulating propagation impairment conditions of identified test scenarios comprises:
modifying signal parameters to simulate multi-path effects;
modifying signal parameters to simulate path loss effects; and
modifying signal parameters to simulate Doppler frequency shift effects.

22. The method of claim 19, wherein the desired conditions and environments are simulated by:
utilizing the Okumura-Hata path loss models to estimate the outdoor path loss effects of an outdoor environment; and
utilizing indoor path loss models to estimate the indoor path loss effects of an indoor environment.

23. The method of claim 19, wherein said wireless communication system is a cellular telephone system.

24. The method of claim 23, further including:
determining the location of a signal transmission.

25. The method of claim 23, wherein the quality of voice transmission over said cellular telephone system is tested.

26. The method of claim 23, wherein the quality of data transmission over said cellular telephone system is tested.

27. The method of claim 19, wherein said wireless communication system is a personal communication system (PCS).

28. The method of claim 27, further including:
determining the location of a signal transmission.

29. The method of claim 27, wherein the quality of voice transmission over said personal communication system is tested.

30. The method of claim 27, wherein the quality of data transmission over said personal communication system is tested.

31. The method of claim 19, wherein said wireless communication system is a broadband system.

32. The method of claim 31 further including:
determining the location of a signal transmission.

33. The method of claim 31, wherein the quality of voice transmission over said broadband system is tested.

34. The method of claim 31, wherein the quality of data transmission over said broadband system is tested.

* * * * *